(12) United States Patent
Vasudevan et al.

(10) Patent No.: US 9,253,113 B2
(45) Date of Patent: Feb. 2, 2016

(54) CUSTOMIZABLE MODEL FOR THROTTLING AND PRIORITIZING ORDERS IN A CLOUD ENVIRONMENT

(71) Applicant: Oracle International Corporation, Redwood Shores, CA (US)

(72) Inventors: Ramesh Vasudevan, Los Altos, CA (US); Anjani Kalyan Prathipati, Union City, CA (US); Pradeep Seetharam, Fremont, CA (US); Gopalan Arun, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 172 days.

(21) Appl. No.: 13/909,795

(22) Filed: Jun. 4, 2013

(65) Prior Publication Data

US 2014/0075034 A1  Mar. 13, 2014

Related U.S. Application Data

(60) Provisional application No. 61/698,413, filed on Sep. 7, 2012, provisional application No. 61/698,459, filed on Sep. 7, 2012, provisional application No. 61/785,299, filed on Mar. 14, 2013, provisional application No. 61/798,714, filed on Mar. 15, 2013, provisional application No. 61/794,427, filed on Mar. 15, 2013.

(51) Int. Cl.
*G06F 15/173* (2006.01)
*H04L 12/911* (2013.01)
*H04L 12/24* (2006.01)

(52) U.S. Cl.
CPC ............ *H04L 47/70* (2013.01); *H04L 41/5054* (2013.01)

(58) Field of Classification Search
CPC ....... H04L 47/00; H04L 47/78; H04L 47/781; H04L 47/821; G06F 9/5027
See application file for complete search history.

(56) References Cited

U.S. PATENT DOCUMENTS 5,892,909 A  4/1999  Grasso et al.
5,911,143 A  6/1999  Deinhart et al.
(Continued)

FOREIGN PATENT DOCUMENTS

EP  0538464 A1  4/1993
EP  1914951 A1  4/2008
(Continued)

OTHER PUBLICATIONS

U.S. Appl. No. 13/842,269, Non Final Office Action mailed on Jun. 5, 2014, 12 pages.
(Continued)

*Primary Examiner* — Esther B Henderson
(74) *Attorney, Agent, or Firm* — Kilpatrick Townsend and Stockton LLP

(57) ABSTRACT

A method for controlling the provisioning of a service associated with a customer order is disclosed. The method may comprise receiving, by a cloud infrastructure system, an order for a service from a plurality of service provided by the cloud infrastructure system, the cloud infrastructure system comprising one or more computing devices. Additionally, the method may comprise determining, by a computing device from the one or more computing devices, based upon a set of rules and system-related information, whether the order is to be forwarded for provisioning one or more resources for enabling the order. Then, based upon the determining, the method may forward the order for provisioning of the one or more resources or not forwarding the order for provisioning.

35 Claims, 18 Drawing Sheets

(56) References Cited

U.S. PATENT DOCUMENTS

| | | | |
|---|---|---|---|
| 5,970,120 | A | 10/1999 | Kasrai |
| 6,052,684 | A | 4/2000 | Du |
| 6,085,188 | A | 7/2000 | Bachmann et al. |
| 6,236,988 | B1 | 5/2001 | Aldred |
| 6,516,416 | B2 | 2/2003 | Gregg et al. |
| 6,526,513 | B1 | 2/2003 | Shrader et al. |
| 6,546,095 | B1 | 4/2003 | Iverson et al. |
| 6,553,364 | B1 | 4/2003 | Wu |
| 6,611,506 | B1 | 8/2003 | Huang et al. |
| 7,031,967 | B2 | 4/2006 | Cheng et al. |
| 7,051,039 | B1 | 5/2006 | Murthy et al. |
| 7,130,839 | B2 | 10/2006 | Boreham et al. |
| 7,136,867 | B1 | 11/2006 | Chatterjee et al. |
| 7,290,288 | B2 | 10/2007 | Gregg et al. |
| 7,428,503 | B1 | 9/2008 | Groff et al. |
| 7,565,310 | B2 | 7/2009 | Gao et al. |
| 7,664,866 | B2 | 2/2010 | Wakefield |
| 7,912,930 | B1 | 3/2011 | Farooqi et al. |
| 7,921,299 | B1 | 4/2011 | Anantha et al. |
| 7,953,896 | B2 | 5/2011 | Ward et al. |
| 7,992,194 | B2 | 8/2011 | Damodaran et al. |
| 8,095,629 | B2 | 1/2012 | Ward et al. |
| 8,151,323 | B2 | 4/2012 | Harris et al. |
| 8,204,794 | B1 | 6/2012 | Peng et al. |
| 8,291,490 | B1 | 10/2012 | Ahmed et al. |
| 8,321,921 | B1 | 11/2012 | Ahmed et al. |
| 8,380,880 | B2 * | 2/2013 | Gulley et al. .................. 709/248 |
| 8,387,136 | B2 | 2/2013 | Lee et al. |
| 8,387,137 | B2 | 2/2013 | Lee et al. |
| 8,402,514 | B1 | 3/2013 | Thompson et al. |
| 8,434,129 | B2 | 4/2013 | Kannappan et al. |
| 8,499,005 | B2 | 7/2013 | Brooks et al. |
| 8,572,602 | B1 | 10/2013 | Colton et al. |
| 8,631,477 | B2 | 1/2014 | Chen et al. |
| 8,631,478 | B2 | 1/2014 | Chen et al. |
| 8,656,002 | B1 | 2/2014 | Adogla et al. |
| 8,738,775 | B1 | 5/2014 | Adogla et al. |
| 8,769,622 | B2 | 7/2014 | Chang et al. |
| 8,769,704 | B2 | 7/2014 | Peddada et al. |
| 8,788,663 | B1 | 7/2014 | Adogla et al. |
| 8,789,157 | B2 | 7/2014 | Sinn |
| 8,806,593 | B1 | 8/2014 | Raphel et al. |
| 8,843,997 | B1 | 9/2014 | Hare |
| 8,849,685 | B2 | 9/2014 | Oden |
| 9,015,114 | B2 | 4/2015 | Chatterjee et al. |
| 2002/0059210 | A1 | 5/2002 | Makus et al. |
| 2002/0156664 | A1 | 10/2002 | Willcox et al. |
| 2003/0212991 | A1 | 11/2003 | Mahajan |
| 2003/0233465 | A1 | 12/2003 | Le et al. |
| 2004/0022379 | A1 | 2/2004 | Klos et al. |
| 2004/0066930 | A1 | 4/2004 | Bangor |
| 2004/0177133 | A1 | 9/2004 | Harrison et al. |
| 2004/0243941 | A1 | 12/2004 | Fish |
| 2004/0267872 | A1 | 12/2004 | Serdy et al. |
| 2005/0071209 | A1 | 3/2005 | Tatavu et al. |
| 2005/0144033 | A1 | 6/2005 | Vreeke et al. |
| 2005/0198629 | A1 | 9/2005 | Vishwanath |
| 2005/0273346 | A1 | 12/2005 | Frost |
| 2005/0289013 | A1 | 12/2005 | Goldberg |
| 2005/0289072 | A1 | 12/2005 | Sabharwal |
| 2006/0059029 | A1 | 3/2006 | Chalasani et al. |
| 2006/0059539 | A1 | 3/2006 | Shashikumar et al. |
| 2006/0143704 | A1 | 6/2006 | Rits et al. |
| 2006/0173724 | A1 | 8/2006 | Trefler et al. |
| 2006/0265583 | A1 | 11/2006 | Eilam et al. |
| 2006/0277595 | A1 | 12/2006 | Kinser et al. |
| 2007/0005536 | A1 | 1/2007 | Caswell et al. |
| 2007/0028098 | A1 | 2/2007 | Baartman et al. |
| 2007/0112952 | A1 | 5/2007 | Sodhi et al. |
| 2007/0150480 | A1 | 6/2007 | Hwang et al. |
| 2007/0169168 | A1 | 7/2007 | Lim |
| 2007/0174101 | A1 | 7/2007 | Li et al. |
| 2007/0203798 | A1 | 8/2007 | Caballero et al. |
| 2007/0215683 | A1 | 9/2007 | Koorland et al. |
| 2007/0220140 | A1 | 9/2007 | Weidenschlager |
| 2007/0283147 | A1 | 12/2007 | Fried et al. |
| 2008/0027825 | A1 | 1/2008 | Boonie et al. |
| 2008/0077680 | A1 | 3/2008 | Dellarole et al. |
| 2008/0080718 | A1 | 4/2008 | Meijer et al. |
| 2008/0083036 | A1 | 4/2008 | Ozzie et al. |
| 2008/0089520 | A1 | 4/2008 | Kessler |
| 2008/0097816 | A1 | 4/2008 | Freire et al. |
| 2008/0127183 | A1 | 5/2008 | Emerson et al. |
| 2008/0147584 | A1 | 6/2008 | Buss |
| 2008/0189250 | A1 | 8/2008 | Cha et al. |
| 2008/0256606 | A1 | 10/2008 | Koikara et al. |
| 2008/0270597 | A1 | 10/2008 | Tenenti |
| 2008/0281617 | A1 | 11/2008 | Conrad et al. |
| 2008/0313716 | A1 | 12/2008 | Park |
| 2009/0126007 | A1 | 5/2009 | Zamberlan et al. |
| 2009/0144729 | A1 | 6/2009 | Guizar |
| 2009/0157457 | A1 | 6/2009 | Huuhtanen et al. |
| 2009/0178102 | A1 | 7/2009 | Alghathbar et al. |
| 2009/0205018 | A1 | 8/2009 | Ferraiolo et al. |
| 2009/0265753 | A1 | 10/2009 | Anderson et al. |
| 2009/0300604 | A1 | 12/2009 | Barringer |
| 2009/0320093 | A1 | 12/2009 | Glazier et al. |
| 2010/0125477 | A1 | 5/2010 | Mousseau et al. |
| 2010/0198730 | A1 | 8/2010 | Ahmed et al. |
| 2010/0205152 | A1 | 8/2010 | Ansari et al. |
| 2010/0211781 | A1 | 8/2010 | Auradkar et al. |
| 2010/0251339 | A1 | 9/2010 | McAlister |
| 2010/0280958 | A1 | 11/2010 | Hasson et al. |
| 2010/0306818 | A1 | 12/2010 | Li et al. |
| 2010/0318393 | A1 | 12/2010 | Acker et al. |
| 2011/0029983 | A1 | 2/2011 | Lu et al. |
| 2011/0072436 | A1 | 3/2011 | Gilat et al. |
| 2011/0103566 | A1 | 5/2011 | Sarkar et al. |
| 2011/0126207 | A1 | 5/2011 | Wipfel et al. |
| 2011/0131146 | A1 | 6/2011 | Skutnik |
| 2011/0131309 | A1 | 6/2011 | Akiyama et al. |
| 2011/0137805 | A1 * | 6/2011 | Brookbanks et al. ........... 705/80 |
| 2011/0138051 | A1 | 6/2011 | Dawson et al. |
| 2011/0153969 | A1 | 6/2011 | Petrick |
| 2011/0211686 | A1 | 9/2011 | Wall et al. |
| 2011/0218813 | A1 | 9/2011 | Addala et al. |
| 2011/0218842 | A1 | 9/2011 | Addala et al. |
| 2011/0218924 | A1 | 9/2011 | Addala et al. |
| 2011/0218925 | A1 | 9/2011 | Addala et al. |
| 2011/0225081 | A1 | 9/2011 | Kittelsen et al. |
| 2011/0231280 | A1 | 9/2011 | Farah |
| 2011/0238458 | A1 | 9/2011 | Purcell et al. |
| 2011/0276951 | A1 | 11/2011 | Jain |
| 2011/0288968 | A1 | 11/2011 | King et al. |
| 2011/0307523 | A1 | 12/2011 | Balani et al. |
| 2011/0313902 | A1 | 12/2011 | Liu et al. |
| 2011/0314466 | A1 | 12/2011 | Berg et al. |
| 2012/0005341 | A1 | 1/2012 | Seago et al. |
| 2012/0032945 | A1 | 2/2012 | Dare et al. |
| 2012/0036220 | A1 | 2/2012 | Dare et al. |
| 2012/0036245 | A1 | 2/2012 | Dare et al. |
| 2012/0036440 | A1 | 2/2012 | Dare et al. |
| 2012/0036442 | A1 | 2/2012 | Dare et al. |
| 2012/0036552 | A1 | 2/2012 | Dare et al. |
| 2012/0066755 | A1 | 3/2012 | Peddada et al. |
| 2012/0072555 | A1 | 3/2012 | DeLuca et al. |
| 2012/0089426 | A1 * | 4/2012 | Borucki ........................... 705/5 |
| 2012/0096521 | A1 | 4/2012 | Peddada |
| 2012/0110583 | A1 | 5/2012 | Balko et al. |
| 2012/0131166 | A1 | 5/2012 | Barbedette et al. |
| 2012/0131194 | A1 | 5/2012 | Morgan |
| 2012/0136936 | A1 | 5/2012 | Quintuna |
| 2012/0150693 | A1 | 6/2012 | Dueck et al. |
| 2012/0159494 | A1 | 6/2012 | Shafiee et al. |
| 2012/0159503 | A1 | 6/2012 | Shafiee et al. |
| 2012/0221454 | A1 | 8/2012 | Morgan |
| 2012/0226796 | A1 | 9/2012 | Morgan |
| 2012/0226808 | A1 | 9/2012 | Morgan |
| 2012/0246248 | A1 | 9/2012 | Arita |
| 2012/0271949 | A1 | 10/2012 | Radhakrishnan et al. |
| 2012/0284776 | A1 | 11/2012 | Sundaram et al. |
| 2012/0297441 | A1 | 11/2012 | Boldyrev et al. |
| 2012/0304191 | A1 | 11/2012 | Morgan |
| 2012/0311153 | A1 | 12/2012 | Morgan |

(56) References Cited

U.S. PATENT DOCUMENTS

| | | | |
|---|---|---|---|
| 2012/0311154 | A1 | 12/2012 | Morgan |
| 2013/0007195 | A1 | 1/2013 | Rinard et al. |
| 2013/0007265 | A1 | 1/2013 | Benedetti et al. |
| 2013/0030859 | A1 | 1/2013 | Jung et al. |
| 2013/0047230 | A1 | 2/2013 | Krishnan et al. |
| 2013/0103640 | A1 | 4/2013 | Rehman |
| 2013/0110943 | A1 | 5/2013 | Menon et al. |
| 2013/0124401 | A1 | 5/2013 | Del Real |
| 2013/0145300 | A1 | 6/2013 | Mackay et al. |
| 2013/0152183 | A1 | 6/2013 | Plewnia et al. |
| 2013/0204994 | A1 | 8/2013 | Deshmukh et al. |
| 2013/0212160 | A1 | 8/2013 | Lawson et al. |
| 2013/0212420 | A1 | 8/2013 | Lawson et al. |
| 2013/0254882 | A1 | 9/2013 | Kannappan et al. |
| 2013/0262556 | A1* | 10/2013 | Xu et al. .................... 709/202 |
| 2013/0268480 | A1 | 10/2013 | Dorman |
| 2013/0268491 | A1 | 10/2013 | Chung et al. |
| 2013/0275509 | A1 | 10/2013 | Micucci et al. |
| 2013/0283350 | A1 | 10/2013 | Afek et al. |
| 2013/0290710 | A1 | 10/2013 | Broder et al. |
| 2013/0298212 | A1 | 11/2013 | Shah et al. |
| 2013/0332984 | A1 | 12/2013 | Sastry et al. |
| 2013/0332985 | A1 | 12/2013 | Sastry et al. |
| 2013/0336235 | A1 | 12/2013 | Meyer et al. |
| 2014/0020054 | A1 | 1/2014 | Lim |
| 2014/0059002 | A1 | 2/2014 | Lockhart et al. |
| 2014/0074539 | A1 | 3/2014 | Doering et al. |
| 2014/0074540 | A1 | 3/2014 | Evans et al. |
| 2014/0074544 | A1 | 3/2014 | Seetharam et al. |
| 2014/0074659 | A1 | 3/2014 | Chatterjee et al. |
| 2014/0074788 | A1 | 3/2014 | Chatterjee et al. |
| 2014/0074793 | A1 | 3/2014 | Doering et al. |
| 2014/0074999 | A1 | 3/2014 | Khalsa et al. |
| 2014/0075016 | A1 | 3/2014 | Chatterjee et al. |
| 2014/0075027 | A1 | 3/2014 | Chatterjee et al. |
| 2014/0075031 | A1 | 3/2014 | Doering et al. |
| 2014/0075032 | A1 | 3/2014 | Vasudevan et al. |
| 2014/0075033 | A1 | 3/2014 | Doering et al. |
| 2014/0075239 | A1 | 3/2014 | Prathipati et al. |
| 2014/0075499 | A1 | 3/2014 | Arun et al. |
| 2014/0075501 | A1 | 3/2014 | Srinivasan et al. |
| 2014/0075565 | A1 | 3/2014 | Srinivasan et al. |
| 2014/0141743 | A1 | 5/2014 | Shaw |
| 2014/0143083 | A1 | 5/2014 | Prathipati et al. |
| 2014/0192717 | A1 | 7/2014 | Liu et al. |
| 2014/0237502 | A1 | 8/2014 | Kelsen et al. |
| 2014/0280943 | A1 | 9/2014 | Bobrov et al. |
| 2014/0372533 | A1 | 12/2014 | Fu et al. |
| 2015/0156218 | A1 | 6/2015 | Arun et al. |

FOREIGN PATENT DOCUMENTS

| | | | |
|---|---|---|---|
| EP | 2458548 | A1 | 5/2012 |
| WO | 2009/018584 | A1 | 2/2009 |
| WO | 2010149222 | | 12/2010 |
| WO | WO2012070993 | A1 | 5/2012 |
| WO | 2014039772 | | 3/2014 |
| WO | 2014039882 | | 3/2014 |
| WO | 2014039918 | | 3/2014 |
| WO | 2014039919 | | 3/2014 |
| WO | 2014039921 | | 3/2014 |

OTHER PUBLICATIONS

U.S. Appl. No. 13/838,813, Non Final Office Action mailed on Aug. 14, 2014, 22 pages.

International Application No. PCT/US2013/058642, Invitation to restrict or pay additional fees mailed on Jul. 23, 2014, 3 pages.

International Patent Application No. PCT/US2013/058426, Written Opinion, mailed Aug. 19, 2014, 7 pages.

International Patent Application No. PCT/US2013/058596, Written Opinion, mailed Aug. 19, 2014, 6 pages.

An Introduction to Role-Based Access Control, NIST/ITL Bulletin, retrieved from the Internet: URL: http://csrc.nist.gov/groups/SNS/rbac/documents/design_implementation/Intro_role_based_access.htm on Oct. 22, 2013, Dec. 1995, 5 pages.

Basic Traversals, The Neo4J Manual, Neo Technology, Inc. (copyright 2012), 7 Pages.

LDAP Authentication Overview, Juniper Networks, Inc. (copyright 1999-2010), 4 pages.

Oracle Internet Directory Administrator's Guide: Introduction to LDAP and Oracle Internet Directory, Oracle, 10g Release 2, B14082-02, retrieved from the Internet: URL: http://docs.oracle.com/cd/B14099_19/idmanage.1012/b14082/intro.htm on Oct. 1, 2013, 1999, 9 pages.

Using ldapsearch, *Red Hat Directory Server 8.2 Administration Guide for managing Directory Server instances Edition* 8.2.8, Red Hat, Inc. (copyright 2010), 3 pages.

XACML v3.0 Hierarchical Resource Profile Version 1.0, Oasis, Working Draft 7, retrieved from the Internet: URL: http://xml.coverpages.org/XACML-v30-HierarchicalResourceProfile-WD7.pdf on Aug. 29, 2013., Apr. 1, 2009, 22 pages.

Afgan et al., CloudMan as a Tool Execution Framework for the Cloud, IEEE Proceedings of the 35th International Convention on Information and Communication Technology, Electronics and Microelectronics (MIPRO 2012), pp. 437-441.

Anthony et al., Consolidation Best Practices: Oracle Database 12c plugs you into the cloud, Oracle White Paper, retrieved from the Internet: URL: http://www.oracle.com/us/products/database/database-private-cloud-wp-360048.pdf on Oct. 1, 2013, Jul. 2013, 30 pages.

Bastos et al., Towards a Cloud-Based Environment for Space Systems Concept Design, IEEE International Conference on Informational Society (I-Society 2012), pp. 478-483.

Bierman et al., Network Configuration Protocol (NETCONF) Access Control Model, Internet Engineering Task Force, RFC 6536, retrieved from the Internet: URL: http://tools.ietf.org/html/rfc6536 on Aug. 29, 2013, Mar. 2012, 50 pages.

Chanliau et al., Oracle Fusion Middleware: Oracle Platform Security Services (OPSS) FAQ, Oracle Corporation, retrieved from the Internet: URL: http://www.oracle.com/technetwork/testcontent/opss-faq-131489.pdf on Oct. 1, 2013, Jul. 2010, 6 pages.

Chiba et al., Dynamic Authorization Extension to Remote Authentication Dial in User Service (RADIUS), Network Working Group, RFC 5176, retrieved from the Internet: URL: http://tools.ietf.org/html/rfc5176 on Aug. 29, 2013, Jan. 2008, 35 pages.

Clemm et al., Web Distributed Authoring and Versioning (WebDAV) Access Control Protocol, Network Working Group, RFC 3744, retrieved from the Internet: URL: http://www.ietf.org/rfc/rfc3744.txt on Aug. 29, 2013, May 2004, 66 pages.

Datta et al., Oracle Fusion Middleware Developer's Guide for Oracle Identity Manager, Oracle Corporation, 11g Release 2, E27150-08, retrieved from the Internet: URL: http://docs.oracle.com/cd/E37115_01/dev.1112/e27150/toc.htm on Oct. 1, 2013, Sep. 2013, 1102 pages.

Demarest et al., Oracle Cloud Computing, An Oracle White Paper, Oracle Corporation, Redwood Shores, CA, May 2010, 22 pages.

Hunter, LDAP Searching—Setting the SCOPE Parameters, available at http://www.idevelopment.info/data/LDAP/LDAP_Resources/SEARCH_Setting_the_SCOPE_Parameter.shtml, (copyright 1998-2013), 2 pages.

Paul et al., Architectures for the future networks and the next generation Internet: A survey, Computer Communications 34: 2-42 (2011).

International Patent Application No. PCT/US2013/058426, International Search Report and Written Opinion mailed on Nov. 8, 2013, 9 pages.

International Patent Application No. PCT/US2013/058596, International Search Report and Written opinion mailed on Nov. 22, 2013, 9 Pages.

International Patent Application No. PCT/US2013/058638, International Search Report and Written Opinion mailed on Jan. 8, 2014, 11 pages.

International Patent Application No. PCT/US2013/058639, International Search Report and Written Opinion mailed on Jan. 8, 2014, 10 pages.

(56) References Cited

OTHER PUBLICATIONS

International Patent Application No. PCT/US2013/058642, International Search Report & Written Opinion mailed on Feb. 7, 2014, 17 pages.
Subi et al., Oracle Fusion Middleware Application Security Guide, Oracle Corporation, 11g Release 1, E10043-09, retrieved from the Internet: URL: http://docs.oracle.com/cd/E21764_01/core.1111/e10043/underjps.htm on Oct. 1, 2013, May 2011, 834 pages.
Teger et al., Oracle Fusion Middleware Developer's Guide for Oracle Access Management, Oracle Corporation, 11g Release 2, E27134-06, retrieved from the Internet: URL: http://docs.oracle.com/cd/E37115_01/dev.1112/e27134/toc.htm on Oct. 1, 2013, Jul. 2013, 372 pages.
Teger, Oracle Fusion Middleware Developer's Guide for Oracle Entitlements Server, Oracle Corporation, 11g Release 1, E27154-01, retrieved from the Internet: URL: http://docs.oracle.com/cd/E27559_01/dev.1112/e27154/handle_auth_calls.htm on Oct. 1, 2013, Jul. 2012, 132 pages.
Oracle—Breaking Cloud Security Barriers with Identity Management, Oracle, 2010, 37 pages.
Oracle Identity Management 11 g—An Oracle Whitepaper, Oracle, Jul. 2010, 61 pages.
Alcaraz Calero, Jose M. et al., "Toward a Multi-Tenancy Authorization System for Cloud Services", IEEE Computer and Realibily Societies, Nov./Dec. 2010, pp. 48-55.
Tsai, Wei-Tek et al., "Role-Based Access Control Using Reference Ontology in Clouds", IEEE, 2011 Tenth International Symposium on Autonomous Decentralized Systems, 2011, pp. 121-128.
Wainwright, Steve, "Oracle Public Cloud—An Enterprise Cloud for Business Critical Applications", Oracle, 2011, 39 pages.
Oracle Unveils Oracle Public Cloud, Oracle, Oct. 5, 2011, 2 pages.
Lau, Christina et al., "Best Practices for access control in multi-tenant cloud solutions using Tivoli Access Manager", IBM, DeveloperWorks, May 1, 2011, 8 pages.
Rashee, Haroon et al., "Multi-Tenancy on Private Cloud", Enlighten, Feb. 2012, 20 pages.
The Oracle Identity Management Platform: Identity Services at Internet Scale, Oracle, Jul. 2012, 20 pages.
U.S. Appl. No. 13/842,269, Notice of Allowance mailed on Nov. 3, 2014, 8 pages.
U.S. Appl. No. 13/842,833, Notice of Allowance mailed on Dec. 15, 2014, 11 pages.
U.S. Appl. No. 13/840,943, Non-Final Office Action mailed on Dec. 18, 2014, 10 pages.
U.S. Appl. No. 13/843,613, Non-Final Office Action mailed on Jan. 23, 2015, 17 pages.
U.S. Appl. No. 14/019,051, Non-Final Office Action mailed on Nov. 20, 2014, 5 pages.
U.S. Appl. No. 13/838,813, Final Office Action mailed on Dec. 4, 2014, 24 pages.
U.S. Appl. No. 13/907,689, Non-Final Office Action mailed on Jan. 7, 2015, 11 pages.
International Application No. PCT/US2013/058426, International Preliminary Report on Patentability mailed on Dec. 5, 2014, 6 pages.
International Application No. PCT/US2013/058596, International Preliminary Report on Patentability mailed on Dec. 5, 2014, 6 pages.
Non-Final Office Action mailed on Aug. 28, 2014 in U.S. Appl. No. 13/838,113, 14 pages.
Non-Final Office Action mailed on Sep. 11, 2014 in U.S. Appl. No. 13/838,537, 22 pages.
Written Opinion mailed on Sep. 11, 2014 in International Application. No. PCT/US2013/058642, 8 pages.
Non-Final Office Action mailed Feb. 18, 2015 in U.S. Appl. No. 13/835,307, 12 pages.
Oracle Service Contracts, User Guide, Release 12, Oracle, Part No. B25717-02, Jun. 2007, 534 pages.
Emig et al., An Access Control Metamodel for Web Service-Oriented Architecture, IEEE, 2007, pp. 1-8.
Jahid et al., MyABDAC: Compiling XACML Policies for Attribute-Based Database Access Control, ACM, Feb. 23, 2011, pp. 97-108.
Kagal et al., A Policy Language for a Pervasive Computing Environment, Proceedings of the 4th IEEE International Workshop on Policies for Distributed Systems and Networks, 2003, pp. 63-74.
Koved et al., Access Rights Analysis for Java, Proceedings of the 17th ACM SIGPLAN conference on Object-oriented programming, systems, languages, and applications, 2002, pp. 359-372.
U.S. Appl. No. 13/838,113, Notice of Allowance mailed on Feb. 23, 2015, 15 pages.
U.S. Appl. No. 13/838,537, Notice of Allowance mailed on Feb. 4, 2015, 19 pages.
U.S. Appl. No. 13/838,813, Non-Final Office Action mailed on Mar. 12, 2015, 21 pages.
U.S. Appl. No. 13/843,613, Final Office Action mailed on Jun. 2, 2015, 20 pages.
U.S. Appl. No. 13/907,652, Non-Final Office Action mailed on Jun. 3, 2015, 10 pages.
U.S. Appl. No. 13/906,835, Non-Final Office Action mailed on Mar. 20, 2015, 16 pages.
Notice of Allowance mailed Jun. 29, 2015 in U.S. Appl. No. 13/840,943, 10 pages.
U.S. Appl. No. 13/841,243 Non-Final Office Action mailed on Jul. 15, 2015, 15 pages.
U.S. Appl. No. 14/019,051, Notice of Allowance mailed on Feb. 27, 2015, 7 pages.
Office action mailed Aug. 7, 2015 in U.S. Appl. No. 13/906,835, 21 pages.
International Application No. PCT/US2013/058639, Written Opinion mailed on Jul. 7, 2015, 6 pages.
International Application No. PCT/US2013/058642, International Preliminary Report on Patentability mailed on Jan. 20, 2015, 10 pages.
International Application No. PCT/US2015/016214 International Search Report and Written Opinion mailed on May 11, 2015, 11 pages.
U.S. Appl. No. 14/618,791, Non-Final Office Action mailed on Sep. 4, 2015, 17 pages.
U.S. Appl. No. 13/841,768, Non-Final Office Action mailed on Oct. 6, 2015, 11 pages.
U.S. Appl. No. 13/841,994, Non-Final Office Action mailed on Oct. 26, 2015, 8 pages.

* cited by examiner

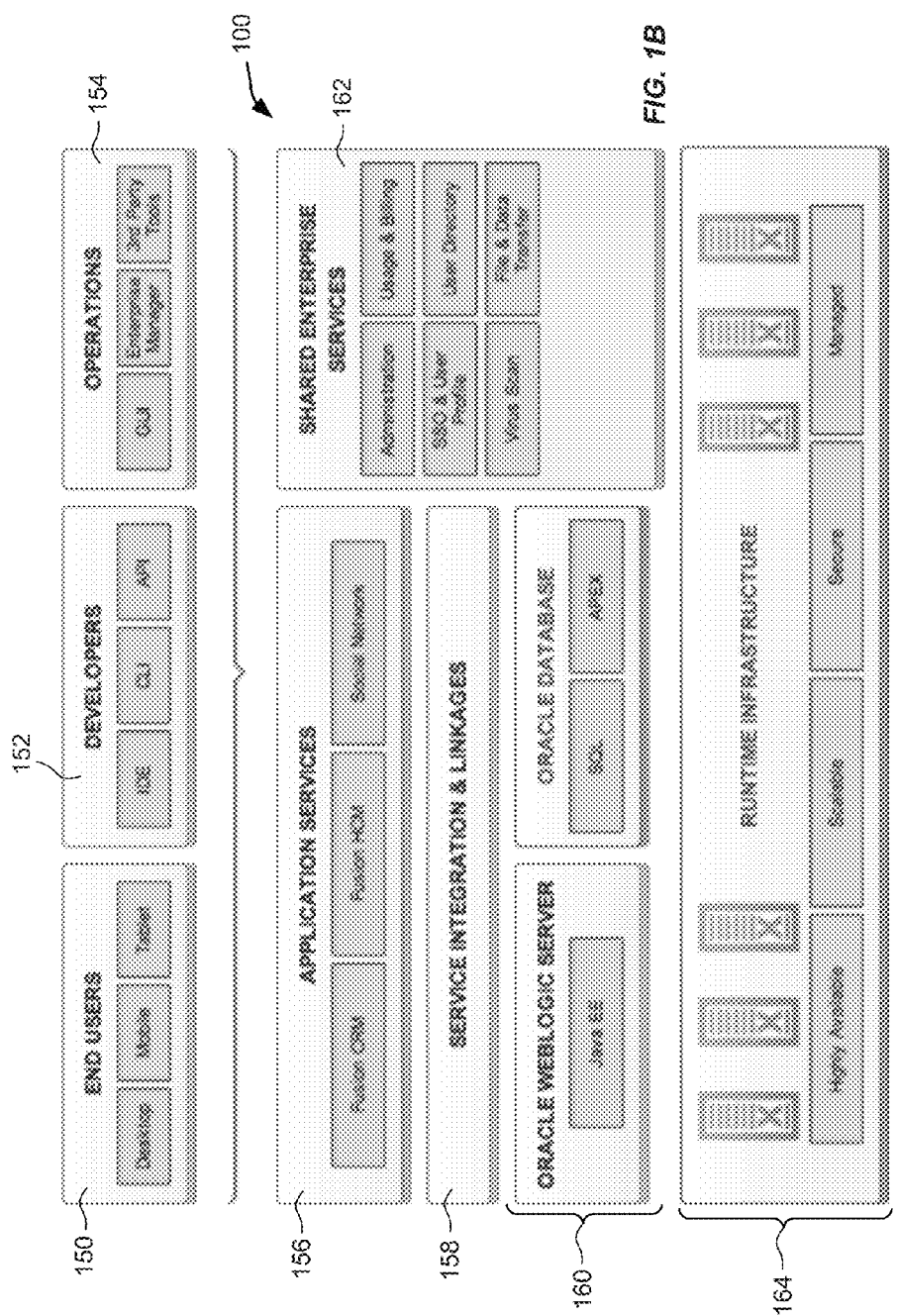

CUSTOMIZABLE MODEL FOR THROTTLING AND PRIORITIZING ORDERS IN A CLOUD ENVIRONMENT

CROSS-REFERENCES TO RELATED APPLICATIONS

The present application is a non-provisional of and claims the benefit and priority under 35 U.S.C. 119(e) of the following applications, the entire contents of which are incorporated herein by reference for all purposes:
(1) U.S. Provisional Application No. 61/698,413, filed Sep. 7, 2012, entitled TENANT AUTOMATION SYSTEM;
(2) U.S. Provisional Application No. 61/698,459, filed Sep. 7, 2012, entitled SERVICE DEVELOPMENT INFRASTRUCTURE;
(3) U.S. Provisional Application No. 61/785,299, filed Mar. 14, 2013, entitled CLOUD INFRASTRUCTURE;
(4) U.S. Provisional Application No. 61/798,714, filed Mar. 15, 2013, entitled CUSTOMIZABLE MODEL FOR THROTTLING AND PRIORITIZING ORDERS IN A CLOUD ENVIRONMENT; and
(5) U.S. Provisional Application No. 61/794,427, filed Mar. 15, 2013, entitled CLOUD INFRASTRUCTURE.

BACKGROUND

The present disclosure relates to computer systems and software, and more particularly to techniques for facilitating and automating the provision of services in a cloud environment.

Cloud computing is a model for enabling convenient, on-demand network access to a shared pool of configurable computing resources (e.g., networks, servers, storage, applications, and services). The services provided or accessed through the cloud (or network) are referred to as cloud services. There is a lot of processing that needs to be performed by a cloud service provider to make cloud services available to a subscribing customer. Due to its complexity, much of this processing is still done manually. For example, provisioning resources for providing such cloud services can be a very labor intensive process.

SUMMARY

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to some embodiments, a method for controlling the provisioning of a service associated with a customer order is disclosed. The method may comprise receiving, by a cloud infrastructure system, an order for a service from a plurality of service provided by the cloud infrastructure system, the cloud infrastructure system comprising one or more computing devices. Additionally, the method may comprise determining, by a computing device from the one or more computing devices, based upon a set of rules and system-related information, whether the order is to be forwarded for provisioning one or more resources for enabling the order. Then, based upon the determining, the method may forward the order for provisioning of the one or more resources or not forwarding the order for provisioning.

According to some embodiments, a system comprising: one or more computing devices configurable to offer a set of cloud services; memory configurable to store an order for a service from the set of cloud service provided by the cloud infrastructure system; and wherein a computing device from the one or more computing devices configurable to: determine based upon a set of rules and system-related information, whether the order is to be forwarded for provisioning one or more resources for enabling the order; and based upon the determination, forward the order for provisioning of the one or more resources or not forwarding the order for provisioning.

According to some embodiments, one or more computer-readable media storing computer executable instructions for a cloud infrastructure system configured to offer a set of cloud services that, when executed, cause one or more computing devices in the cloud infrastructure to: store an order for a service from the set of cloud service provided by the cloud infrastructure system; determine based upon a set of rules and system-related information, whether the order is to be forwarded for provisioning one or more resources for enabling the order; and based upon the determination, forward the order for provisioning of the one or more resources or not forwarding the order for provisioning.

BRIEF DESCRIPTION OF THE DRAWINGS

Illustrative embodiments of the present invention are described in detail below with reference to the following drawing figures:

FIG. 1B is a simplified block diagram of a hardware/software stack that may be used to implement a cloud infrastructure system according to an embodiment of the present invention.

DETAILED DESCRIPTION

Figure 1A:
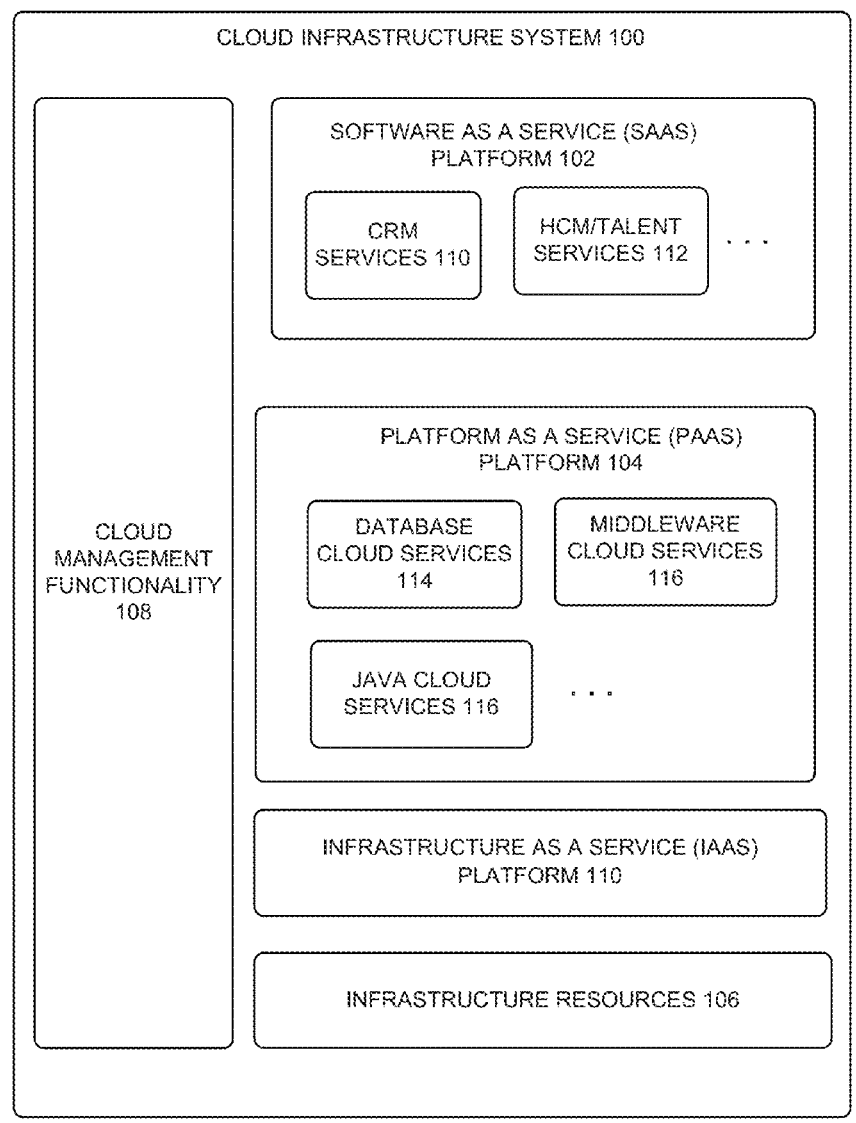
FIG. 1A is a logical view of a cloud infrastructure system according to one embodiment of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

Certain embodiments of the present invention provide techniques for automating the provisioning, managing and tracking of services provided by a cloud infrastructure system.

In certain embodiments, a cloud infrastructure system may include a suite of applications, middleware and database service offerings that are delivered to a customer in a self-service, subscription-based, elastically scalable, reliable, highly available, and secure manner. An example of such a cloud infrastructure system is the Oracle Public Cloud provided by the present assignee.

A cloud infrastructure system may provide many capabilities including, but not limited to, provisioning, managing and tracking a customer's subscription for services and resources in the cloud infrastructure system, providing predictable operating expenses to customers utilizing the services in the cloud infrastructure system, providing robust identity domain separation and protection of a customer's data in the cloud infrastructure system, providing customers with a transparent architecture and control of the design of the cloud infrastructure system, providing customers assured data protection and compliance with data privacy standards and regulations, providing customers with an integrated development experience for building and deploying services in the cloud infrastructure system and providing customers with a seamless integration between business software, middleware, database and infrastructure services in the cloud infrastructure system.

In certain embodiments, services provided by the cloud infrastructure system may include a host of services that are made available to users of the cloud infrastructure system on demand such as online data storage and backup solutions, Web-based e-mail services, hosted office suites and document collaboration services, database processing, managed technical support services and the like. Services provided by the cloud infrastructure system can dynamically scale to meet the needs of its users. A specific instantiation of a service provided by cloud infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer network cloud infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a cloud infrastructure system according to one embodiment of the present invention. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 110 (e.g., Fusion CRM services provided by the Oracle cloud), Human Capital Management (HCM)/Talent Management services 112, and the like. CRM services 110 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present invention. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computing resources such as storage, networks, and other fundamental computing resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

FIG. 1B is a simplified block diagram of a hardware/software stack that may be used to implement cloud infrastructure system 100 according to an embodiment of the present invention. It should be appreciated that implementation depicted in FIG. 1B may have other components than those depicted in FIG. 1B. Further, the embodiment shown in FIG. 1B is only one example of a cloud infrastructure system that may incorporate an embodiment of the invention. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 2:
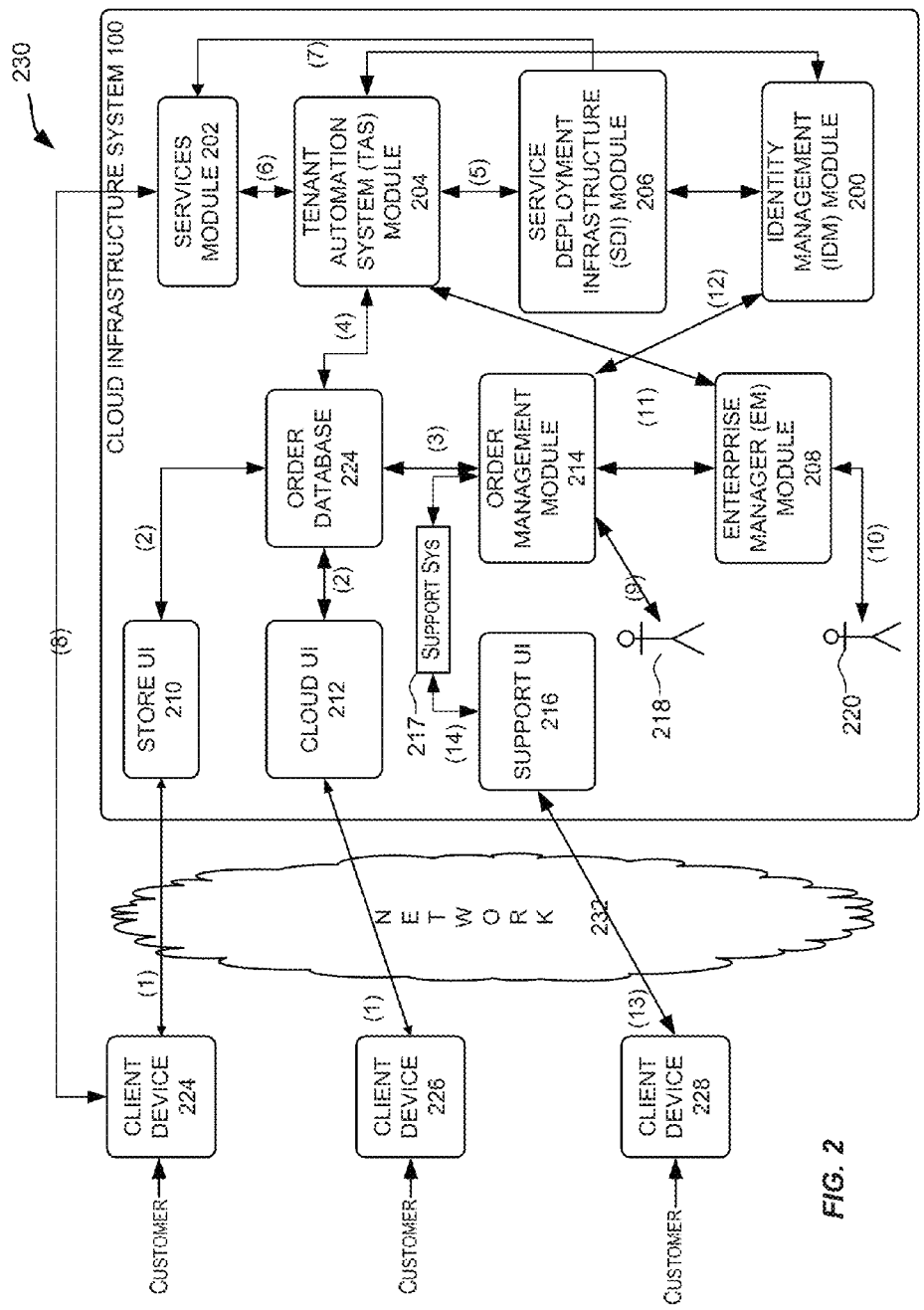
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present invention. In the illustrated embodiment, system environment 230 includes one or more client computing devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the invention. In some other embodiments, cloud infrastructure system 100 may have more or fewer components than shown in FIG. 2, may combine two or more components, or may have a different configuration or arrangement of components.

Client computing devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computing device. For example, client computing devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computing devices, any number of client computing devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1x suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 224. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present invention. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computing resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 224, which can be one of several databases operated by cloud infrastructure system 100 and utilized in conjunction with other system elements. While order database 224 is shown logically as a single database in FIG. 2, in actual implementation, this may comprise one or more databases.

At (3), the order is forwarded to order management module 214. Order management module 214 is configured to perform billing and accounting functions related to the order such as verifying the order and upon verification, booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS module 204. In one embodiment, TAS module 204 utilizes the order information to orchestrate the provisioning of services and resources for the order placed by the customer. At (5), TAS component 204 orchestrates the provisioning of resources to support the subscribed services using the services of SDI module 206. At (6) TAS module 204 provides information related to the provisioned order received from SDI module 206 to services module 202. In some embodiments, at (7), SDI module 206 may also use services provided by services module 202 to allocate and configure the resources needed to fulfill the customer's subscription order.

At (8), services module 202 sends a notification to the customers on client devices 224, 226 and 228 regarding the status of the order.

In certain embodiments, TAS module 204 functions as an orchestration component that manages business processes associated with each order and applies business logic to determine whether an order should proceed to provisioning. In one embodiment, upon receiving an order for a new subscription, TAS module 204 sends a request to SDI module 206 to allocate resources and configure those resources needed to fulfill the subscription order. SDI module 206 enables the allocation of resources for the services ordered by the customer. SDI module 206 provides a level of abstraction between the cloud services provided by cloud infrastructure system 100 and the physical implementation layer that is used to provision the resources for providing the requested services. TAS module 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related functions such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
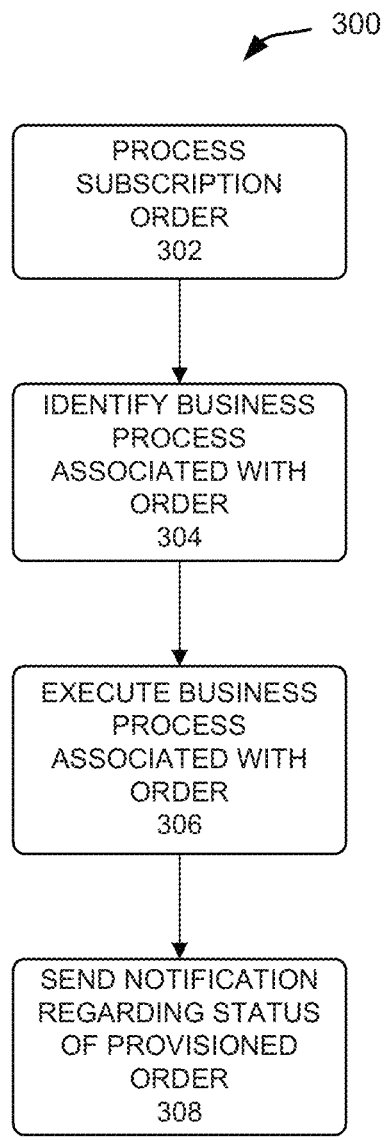
FIG. 3A depicts a simplified flowchart 300 depicting processing that may be performed by the TAS module in the cloud infrastructure system, in accordance with an embodiment of the present invention.

FIG. 3A depicts a simplified flowchart 300 depicting processing that may be performed by the TAS module in the cloud infrastructure system, in accordance with an embodiment of the present invention. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present invention may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS component 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office functions such as creating a customer record for the user, performing accounting functions related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI module 206 to allocate resources and configure those resources needed to fulfill the subscription order.

At 308, a notification is sent to the customer regarding the status of the provisioned order. Additional description related to performing steps 302, 304, 306 and 308 is provided in detail in FIG. 3B.

Figure 3B:
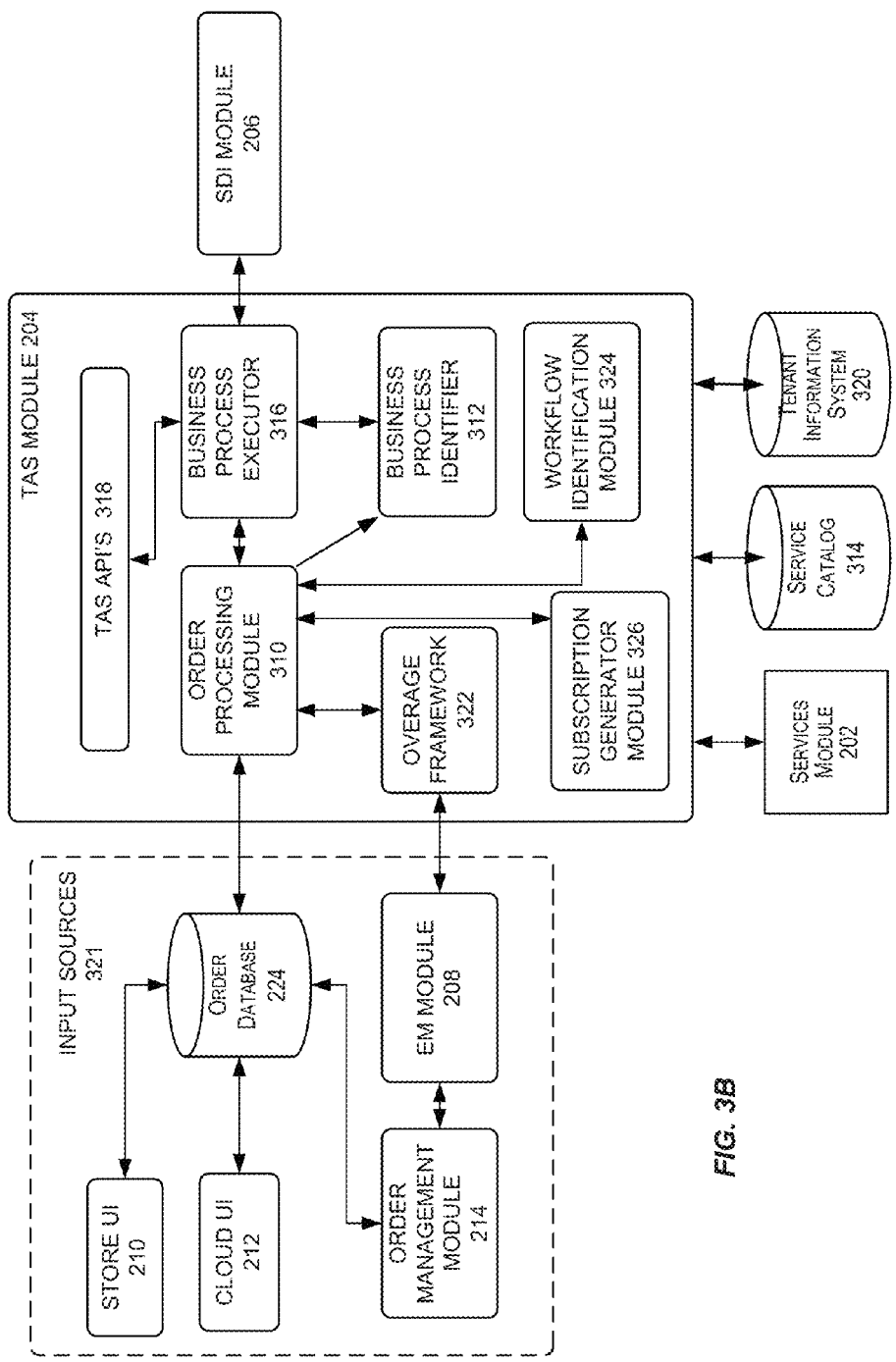
FIG. 3B depicts a simplified high level diagram of one or more sub-modules in the TAS module in the cloud infrastructure system, in accordance with an embodiment of the present invention.

FIG. 3B depicts a simplified high level diagram of one or more sub-modules in the TAS module in the cloud infrastructure system, in accordance with an embodiment of the present invention. In one embodiment, the modules depicted in FIG. 3B perform the processing described in steps 302-308 discussed in FIG. 3A. In the illustrated embodiment, TAS module 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS module depicted in FIG. 3B are meant for illustrative purposes only and are not intended to limit the scope of embodiments of the present invention. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS module 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI module 206 to execute steps in a business process for allocating and provisioning resources for services requested in the subscription order. In this example, for each step in the business process, business process executor 316 may send a request to SDI component 206 to allocate resources and configure resources needed to fulfill the particular step. SDI component 206 is responsible for the actual allocation of the resources. Once all the steps of the business processes of an order have been executed, business process executor 316 may send a notification to the customer of the processed order by utilizing the services of services component 202. The notification may include sending an email notification to the customer with details of the processed order. The email notification may also include deployment information related to the order to enable the customer to access the subscribed services.

In certain embodiments, TAS module 204 may provide one or more TAS Application Programming Interfaces (APIs) 318 that enable TAS module 204 to interact with other modules in cloud infrastructure system 100 and for other modules to interact with TAS module 204. For example, the TAS APIs may include a system provisioning API that interacts with SDI module 206 via an asynchronous Simple Object Access Protocol (SOAP) based web services call to provision resources for the customer's subscription order. In one embodiment, TAS module 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS module 204 also periodically propagates subscription information, outages, and notifications (e.g. planned downtime) to services component 202.

In certain embodiments, TAS module 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS module 204 includes an order workflow identification module 324 that is configured to identify one or more workflows associated with processing a customer's subscription order. In certain embodiments, TAS module 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS module 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS module 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and coordinate services in cloud infrastructure system 100, while the data center components provide capabilities for provisioning and operating the runtime system that provides the resources for the subscribed services.

Figure 4:
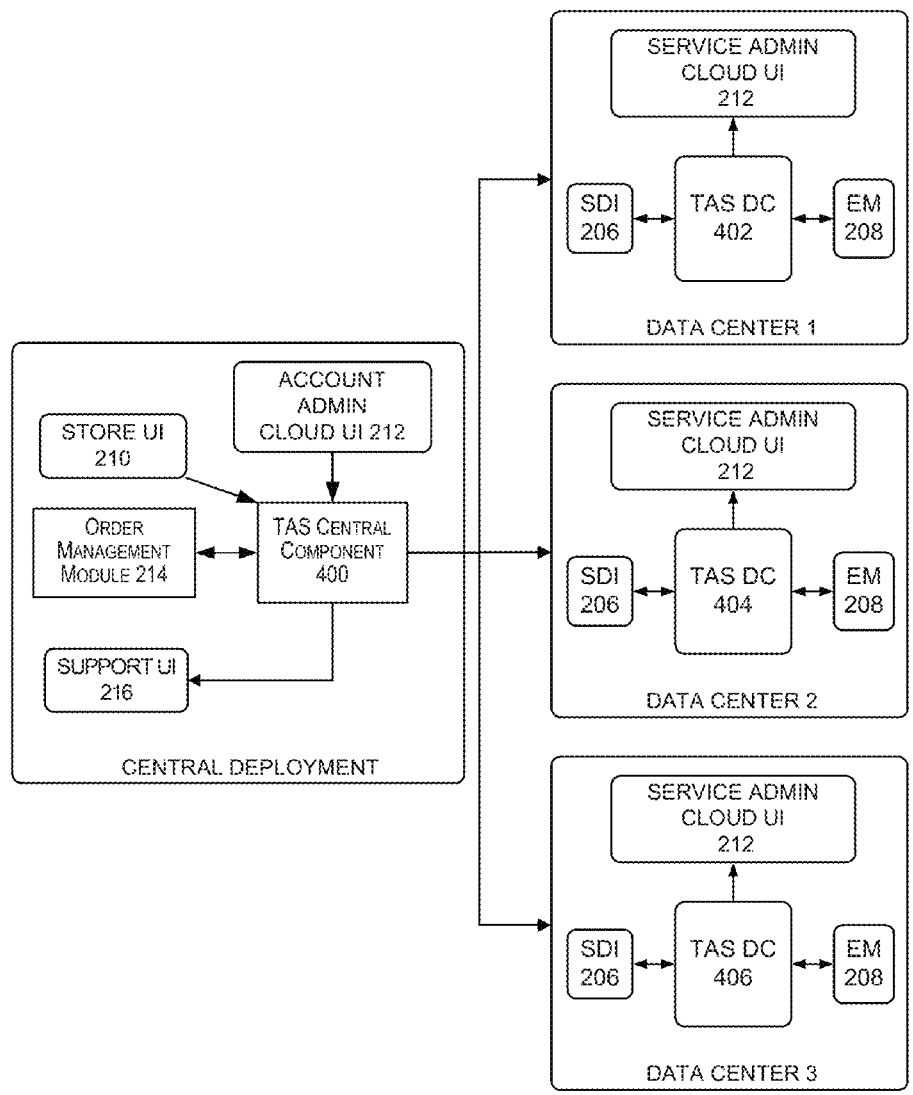
FIG. 4 depicts an exemplary distributed deployment of the TAS component, according to an embodiment of the present invention.

FIG. 4 depicts an exemplary distributed deployment of the TAS module, according to an embodiment of the present invention. In the embodiment depicted in FIG. 4, the distributed deployment of TAS module 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management system 214, or via order database 224. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI module 204 to orchestrate the provisioning of physical resources for the order. SDI component 204 in respective TAS DCs 402, 404 or 406 allocates resources and configures those resources needed to fulfill the subscription order.

In certain embodiments, TAS DCs, 402, 404 or 406 identify an identity domain associated with the subscription. SDI component 206 may provide the identity domain information to IDM component 200 (shown in FIG. 2) for identifying an existing identity domain or creating a new identity domain. Once the order is provisioned by the SDI module at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management system 214.

Figure 5:
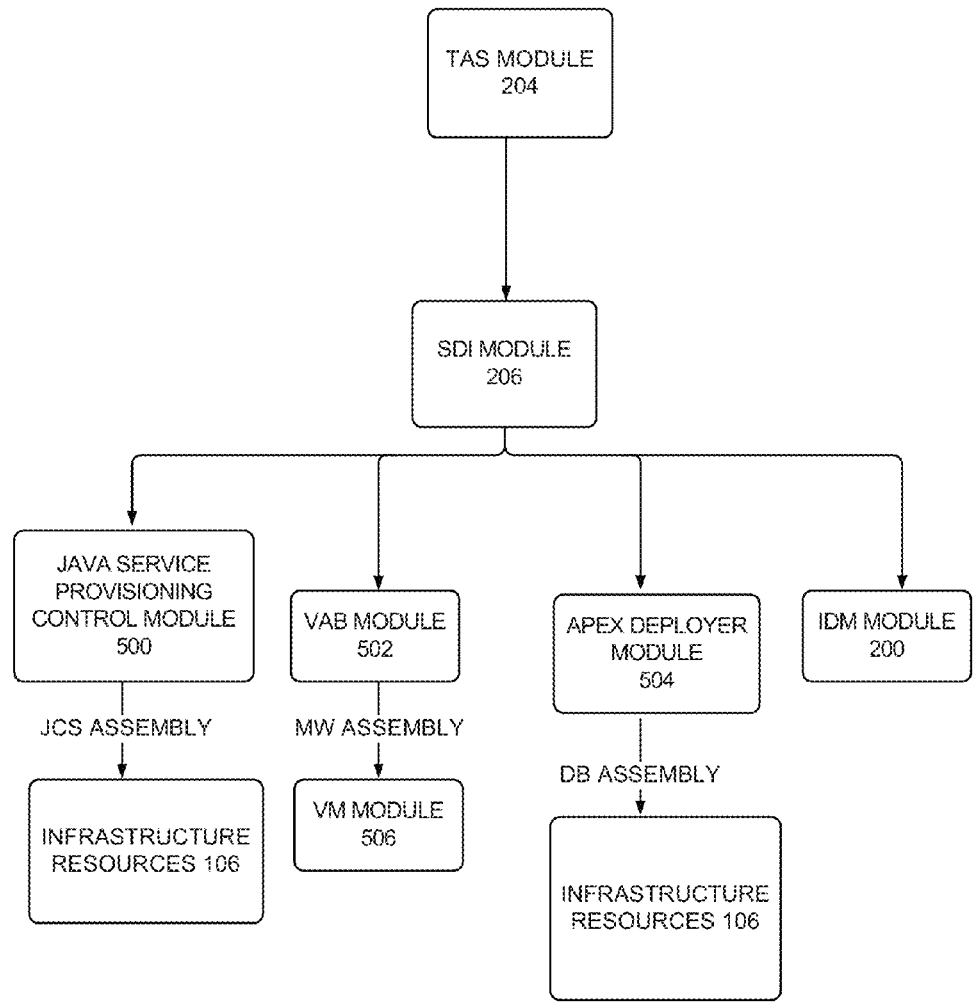
FIG. 5 is a simplified block diagram illustrating the interactions of the SDI module with one or more modules in the cloud infrastructure system, in accordance with an embodiment of the present invention.

FIG. 5 is a simplified block diagram illustrating the interactions of the SDI module with one or more modules in the cloud infrastructure system, in accordance with an embodiment of the present invention. In one embodiment, SDI module 206 interacts with TAS module 204 to provision resources for services in a subscription order received by TAS module 204. In certain embodiments, one or more of the modules illustrated in FIG. 5 may be modules within cloud infrastructure system 100. In other embodiments, one or more of the modules that interact with SDI module 206 may be outside cloud infrastructure system 100. In addition, alternative embodiments may have more or less modules than those shown in FIG. 5. These modules may be implemented in hardware, or software, or combinations thereof.

In one embodiment, the modules in SDI module 206 may include one or more modules in SaaS platform 102 and PaaS platform 104 in cloud infrastructure system 100. In order to perform provisioning of resources for various services, SDI module 206 may interact with various other modules, each customized to help with provisioning resources for a particular type of service. For example, as illustrated in FIG. 5, SDI module 206 may interact with a Java service provisioning control module 500 to provision Java cloud services. In one embodiment, Java service provisioning control component 500 may deploy a Java Cloud Service (JCS) assembly specified by SDI module 206 that includes a set of tasks to be performed to provision Java cloud services. Infrastructure resources 106 then determines the resources needed to provision the Java cloud services.

As other examples, SDI module 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI module 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI module 206 to provision a database service in cloud infrastructure system 100 using the resources provided by infrastructure resources 106. SDI module 206 interacts with IDM module 200 to provide identity services such as access management across multiple applications in cloud infrastructure system 100.

Figure 6:
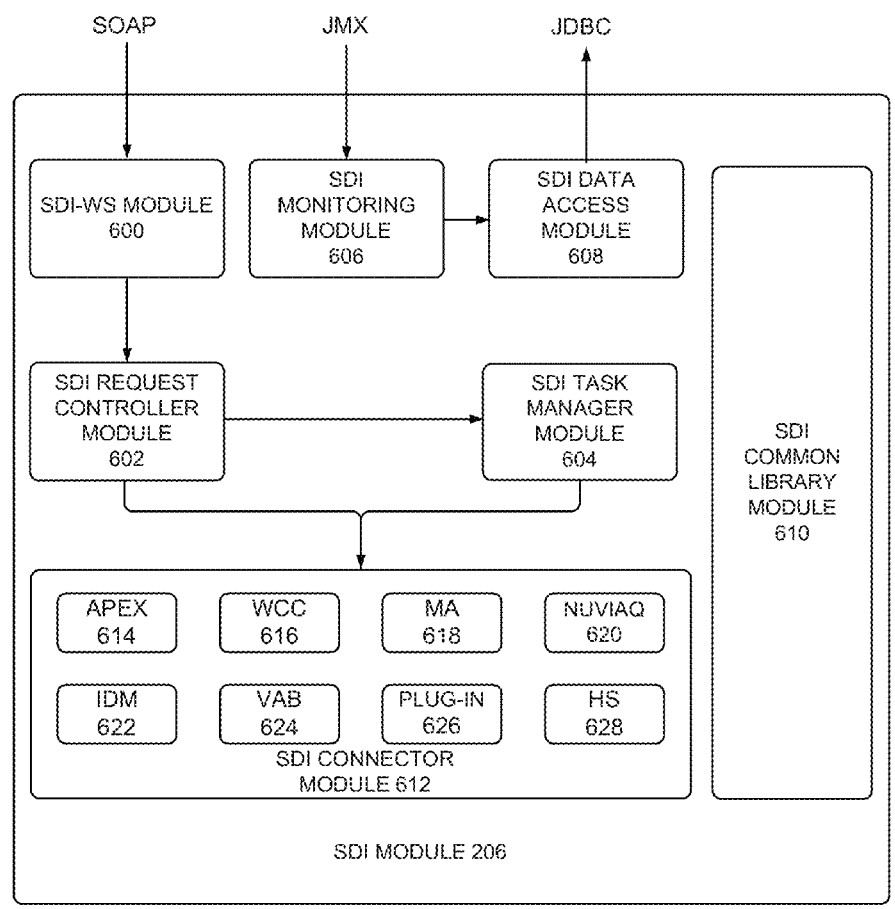
FIG. 6 depicts a simplified high level diagram of sub-modules of the SDI module according to an embodiment of the present invention.

FIG. 6 depicts a simplified high level diagram of sub-modules of the SDI module according to an embodiment of the present invention. In the embodiment depicted in FIG. 6, SDI module 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI module 206 depicted in FIG. 6 and its various modules are meant for illustrative purposes only and are not intended to limit the scope of embodiments of the present invention. Alternative embodiments may have more or less modules than those shown in FIG. 6. These modules and their functions are described in detail below.

SDI-WS module 600 includes capabilities for receiving a step in the business associated with an order from business process executor 316 of TAS component 204. In one embodiment, SDI-WS module 600 parses each step of the business process and converts the step into an internal representation used by SDI module 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI module 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS module 204 with operation results that includes an order payload with details of the resources provisioned to fulfill the particular step. SDI task manager module 604 repeats this process until all the steps of the particular business process associated with the order are complete.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI module 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC) requests. SDI-data access module 608 supports data access and provides object relational mapping, java transaction API services, data access objects, and connection pooling in cloud infrastructure system 100. The SDI-common library module 610 provides configuration support for the modules in SDI module 206.

Figure 7A:
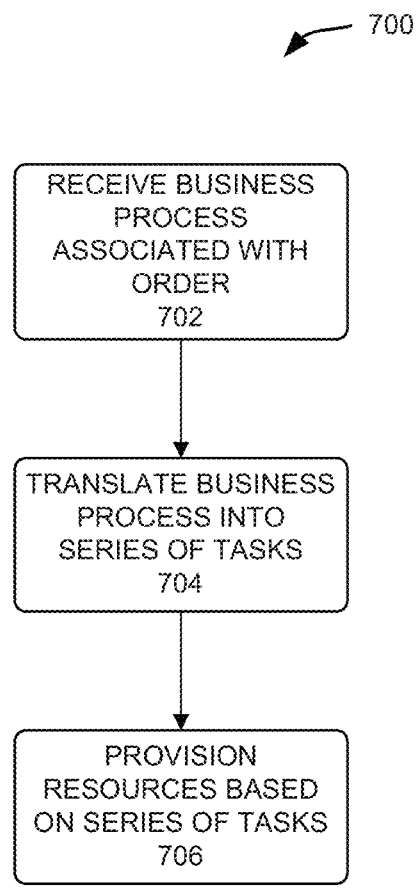
FIG. 7A depicts a simplified flowchart depicting processing that may be performed by the SDI component in the cloud infrastructure system, in accordance with an embodiment of the present invention.

The embodiment of FIG. 6 discussed above describes modules in the SDI module according to an embodiment of the present invention. FIG. 7A depicts a simplified flowchart 700 depicting processing that may be performed by the modules of the SDI module in the cloud infrastructure system, in accordance with an embodiment of the present invention. The processing depicted in FIG. 7A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7A is not intended to be limiting. Other sequences of steps may also be performed according to alternative embodiments. For example, alternative embodiments of the present invention may perform the steps outlined above in a different order. Moreover, the individual steps illustrated in FIG. 7A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI module 206 discussed in detail in FIG. 6.

At 702, a business process associated with a subscription order is received. In one embodiment, SDI-WS module 600 in SDI module 206 receives one or more steps in the business process associated with the subscription order from business process executor 316. At 704, each step in the business process is translated into a series of tasks for provisioning resources for the subscription order. In one embodiment, SDI task manager module 604 in SDI module 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 7B:
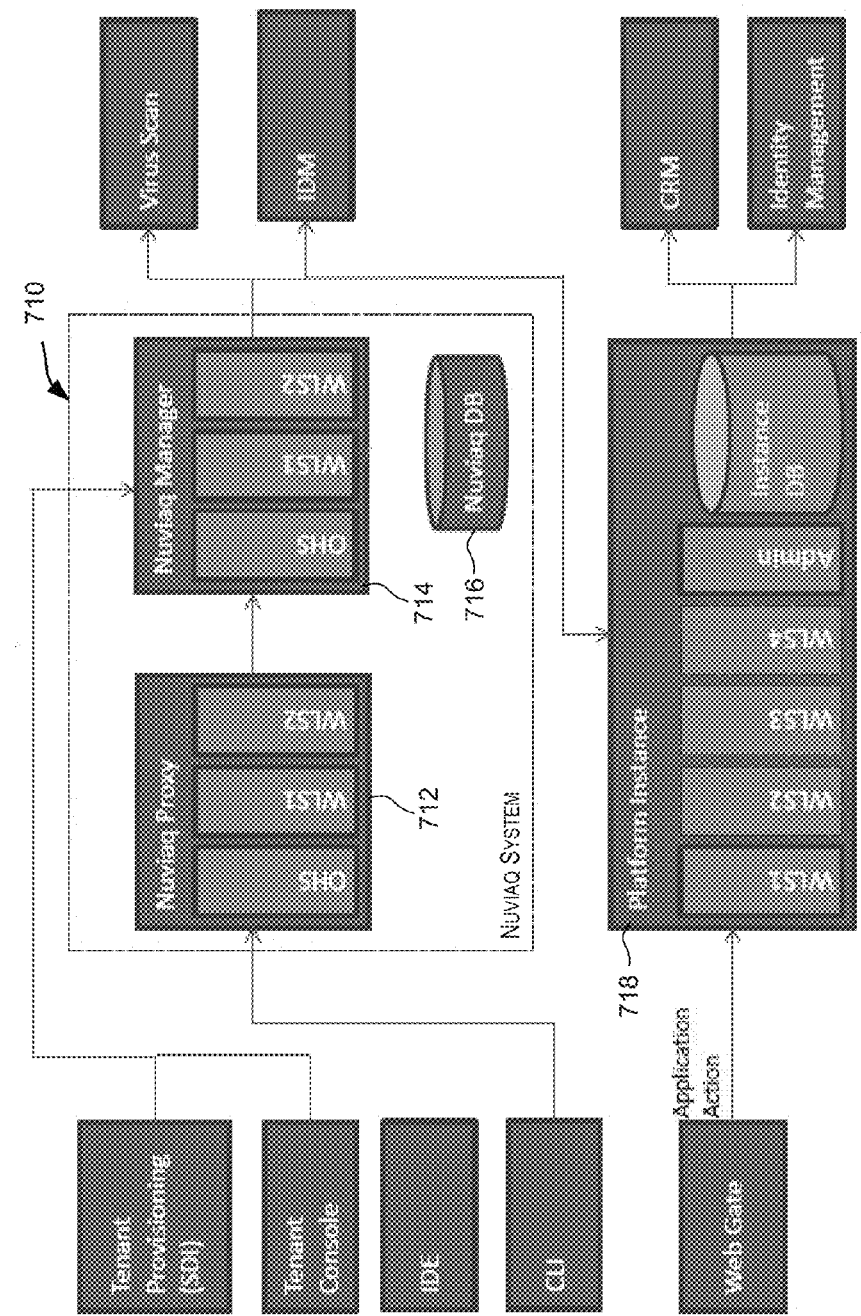
FIG. 7B depicts a simplified block diagram showing the high-level architecture of a Nuviaq system 710 and its relationships with other cloud infrastructure components according to an embodiment of the present invention.

FIG. 7B depicts a simplified block diagram showing the high-level architecture of a Nuviaq system 710 and its relationships with other cloud infrastructure components according to an embodiment of the present invention. It should be appreciated that Nuviaq system 710 depicted in FIG. 7B may have other components than those depicted in FIG. 7B. Further, the embodiment shown in FIG. 7B is only one example of a cloud infrastructure system that may incorporate an embodiment of the invention. In some other embodiments, Nuviaq system 710 may have more or fewer components than shown in FIG. 7B, may combine two or more components, or may have a different configuration or arrangement of components.

In certain embodiments, Nuviaq system 710 may be configured to provide a runtime engine for orchestrating PaaS operations. Nuviaq system 710 may provide a web service API to facilitate integration with other products and services. Nuviaq system 710 also provides support for complex workflows in system provisioning, application deployment and associated lifecycle operations and integrates with management and monitoring solutions.

In the embodiment depicted in FIG. 7B, Nuviaq system 710 comprises a Nuviaq proxy 712, a Nuviaq manager 714, and a Nuviaq database 716. In certain embodiments, Nuviaq manager 714 provides an entry point into Nuviaq system 710, providing secure access to PaaS operations via the web service API. Internally, it tracks system state in the database and controls job execution on the workflow engine. In a public cloud, Nuviaq manager 714 may be accessed by the Tenant Provisioning system (SDI 206) and the Tenant Console, to drive provisioning and deployment operations respectively.

In one embodiment, Nuviaq manager 714 executes jobs asynchronously via an internal workflow engine. A job may be a sequence of actions specific to a given PaaS workflow. Actions may be performed in order, with failure in any step resulting in failure of the overall job. Many workflow actions delegate to external systems relevant to the workflow, such as the EM command line interface (cli). In one implementation, Nuviaq manager 714 application may be hosted in a 2-node WebLogic cluster with associated HTTP server (e.g., Oracle HTTP Server or OHS) instance, running inside a firewall.

In certain embodiments, Nuviaq proxy 712 is the public access point to the Nuviaq API. In one embodiment, only Public API may be exposed here. Requests received by proxy 712 may be forwarded to Nuviaq manager 714. In one embodiment, Nuviaq proxy 712 runs outside the firewall, whereas manager 714 runs within the firewall. In one implementation, Nuviaq proxy 712 application runs on a WebLogic cluster running outside the firewall.

In certain embodiments, Nuviaq database 716 tracks various domain entities such as, without limitation, platform instance, deployment plan, application, WebLogic domain, jobs, alerts, and the like. Primary keys may be aligned with the Service Database where appropriate.

In one embodiment, Platform Instance 718 may contain all resources required for a WebLogic service for a given tenant.

Nuviaq system 710 may rely on additional systems of cloud infrastructure system 100 to carry out the workflows used the WebLogic cloud service. These dependencies may include dependencies on SDI 206, IDM 200, a virus scan system, a service database, CRM instances, and the like. For example, Nuviaq system 710 may depend upon functions performed by an Assembly Deployer in SDI 206. In one embodiment, the Assembly Deployer is a system to manage interactions with OVAB (Oracle Virtual Assembly Builder) and OVM (Oracle Virtual Machine). Capabilities of the Assembly Deployer used by Nuviaq system 710 may include, without limitation, functions for deploying an assembly, undeploying an assembly, describing assembly deployment, scaling appliance, and the like. In one implementation, Nuviaq system 710 accesses the Assembly Deployer via a web service API.

In certain embodiments, security policies may require certain artifacts to be scanned for viruses before being deployed to an application. Cloud infrastructure system 100 may provide a virus scan system for this purpose that provides scanning as a service for multiple components of the public cloud.

In certain embodiments, a public cloud infrastructure may maintain a Service Database containing information about tenants (e.g., customers) and their service subscriptions. Nuviaq workflows may access to this data in order to properly configure a WebLogic service as a client to other services that the tenant also subscribes to.

Nuviaq system 710 may depend on IDM 200 for its security integration. In certain embodiments, Java Service instances can be associated with a CRM instance. The association allows user applications deployed to their Java Service instance to access a CRM instance though Web Service calls.

Various entities may use services provided by Nuviaq system 710. These clients of Nuviaq system 710 may include: a Tenant Console, which is an management server (e.g., Oracle Management Server) based user interface that customers may access to manage their applications on their platform instances; several IDEs such as Oracle IDEs (JDeveloper, NetBeans, and OEPE) have been extended to offer access to application lifecycle management operations; one or more Command Line Interfaces (CLIs) that are available to access lifecycle operations on the platform instances.

Provisioning use case for Nuviaq system 710—A Provision Platform Instance use case is realized via the Create Platform Instance operation of the Nuviaq API. In the context of cloud infrastructure system 100, a service instance with respect to the Nuviaq system corresponds to a Nuviaq platform instance. A platform instance is assigned a unique identifier is used on all subsequent operations related to this instance. A Platform Deployment descriptor provided to the Create Platform Instance action allows for properties to be set that modify the configuration of the platform instance to meet the subscription requirements of the tenant. These properties may include for example:

Property #1: oracle.cloud.service.weblogic.size
Values: BASIC, STANDARD, ENTERPRISE
Description: Specifies the subscription type. This impacts the number of servers, database limits and quality of service settings.
Property #2: oracle.cloud.service.weblogic.trial
Values: TRUE, FALSE
Description: Indicates whether or not this is a trial subscription.
Property #3: oracle.cloud.service.weblogic.crm
Values: CRM Service ID
Description: Identifies a CRM service to be associated with this WebLogic service instance.

Figure 7C:
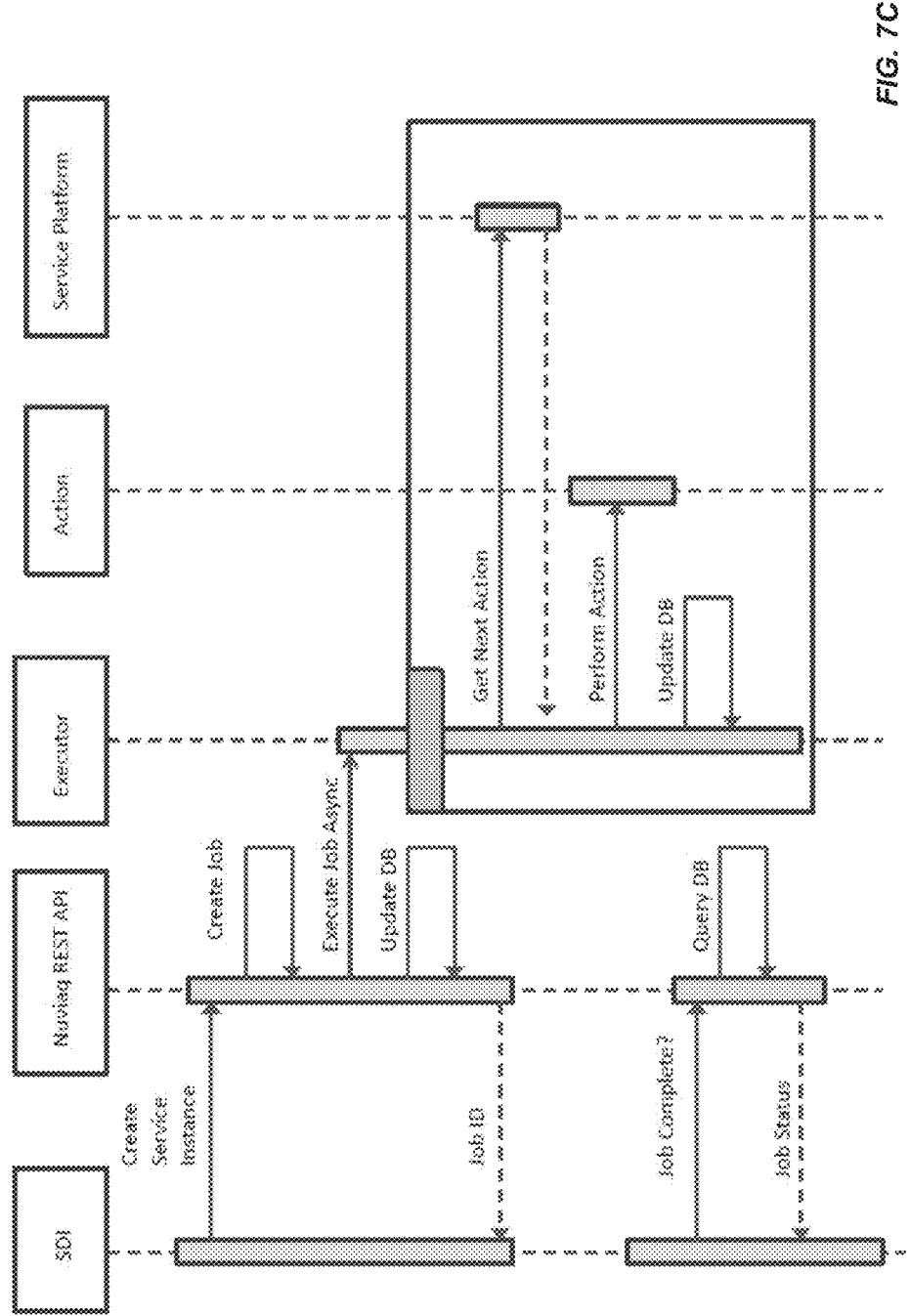
FIG. 7C depicts an example sequence diagram illustrating steps of a provisioning process using a Nuviaq system according to an embodiment of the present invention.

FIG. 7C depicts an example sequence diagram illustrating steps of a provisioning process using a Nuviaq system according to an embodiment of the present invention. The sequence diagram depicted in FIG. 7C is only an example and is not intended to be limiting.

Install/Update Application use case—The Install Application operation deploys an application to a running WebLogic Server after validating that the application archive meets the security requirements of the Public Cloud. In one embodiment, the Application Deployment descriptor provided to the Install Application action allows for properties to be set that modify the configuration of the application to meet the subscription requirements of the tenant. These properties may include for example:
Property: oracle.cloud.service.weblogic.state
Values: RUNNING, STOPPED
Description: Specifies the initial state of the application after deployment.

Figure 7D:
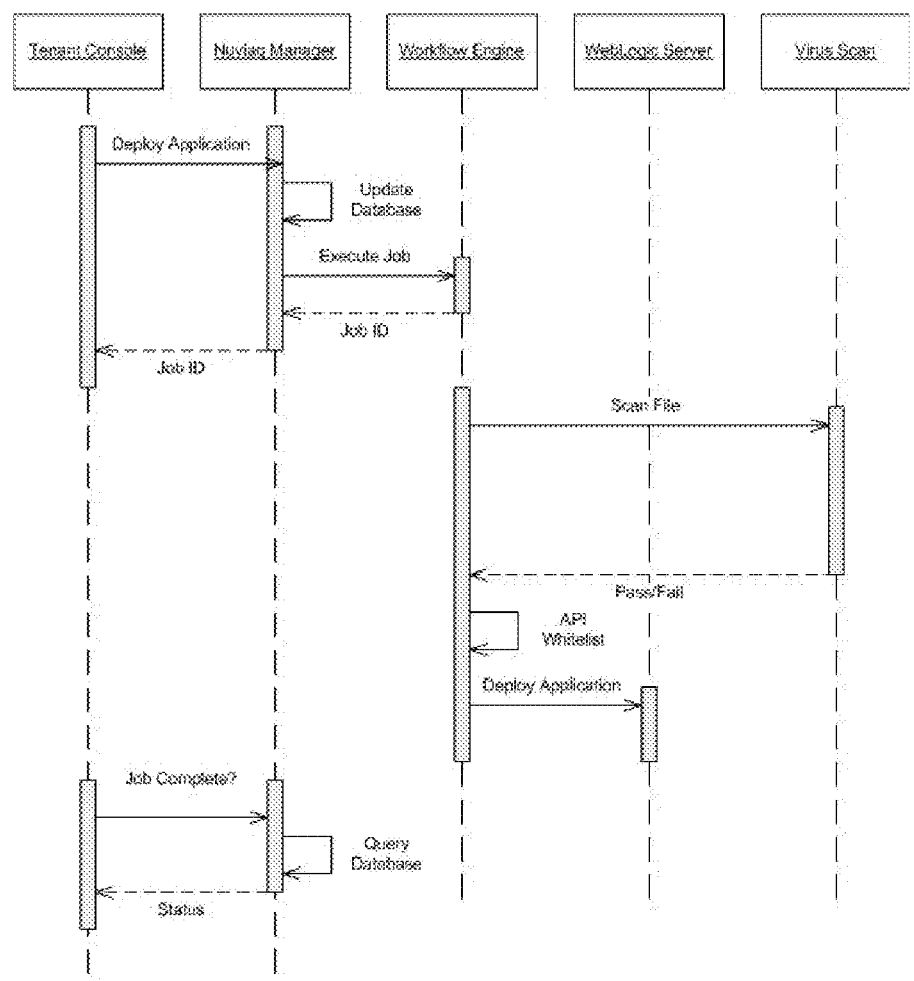
FIG. 7D depicts an example sequence diagram illustrating steps of a deployment process using a Nuviaq system according to an embodiment of the present invention.

FIG. 7D depicts an example sequence diagram illustrating steps of a deployment process using a Nuviaq system according to an embodiment of the present invention. The sequence diagram depicted in FIG. 7D is only an example and is not intended to be limiting.

Referring back to FIG. 2, in certain embodiments, TAS 204 and SDI 206 working in cooperation are responsible for provisioning resources for one or more services ordered by a customer from a set of services offered by cloud infrastructure system 100. For example, in one embodiment, for provisioning a database service, the automated provisioning flow may be as follows for a paid subscription:

(1) Customer places an order for a paid subscription to a service via Store UI 210.
(2) TAS 204 receives the subscription order.
(3) When services are available TAS 204 initiates provisioning by using the services of SDI 206. TAS 204 may perform business process orchestration, which will execute the relevant business process to complete the provisioning aspect of the order. In one embodiment, TAS 204 may use a BPEL (Business Process Execution Language) Process Manager to orchestrate the steps involved in the provisioning and handle the lifecycle operations.
(4) In one embodiment, to provision a database service, SDI 206 may call PLSQL APIs in the CLOUD_UI to associate a schema for the requesting customer.
(5) After successful association of a schema to the customer, SDI signals TAS and TAS send a notification to the customer that the database service is now available for use by the customer.
(6) The customer may log into cloud infrastructure system 100 (e.g., using an URAL such as cloud.oracle.com) and activate the service.

In some embodiments, a customer may also be allowed to subscribe to a service on a trial basis. For example, such a trial order may be received via cloud UI 212 (e.g., using cloud.oracle.com).

Figure 7E:
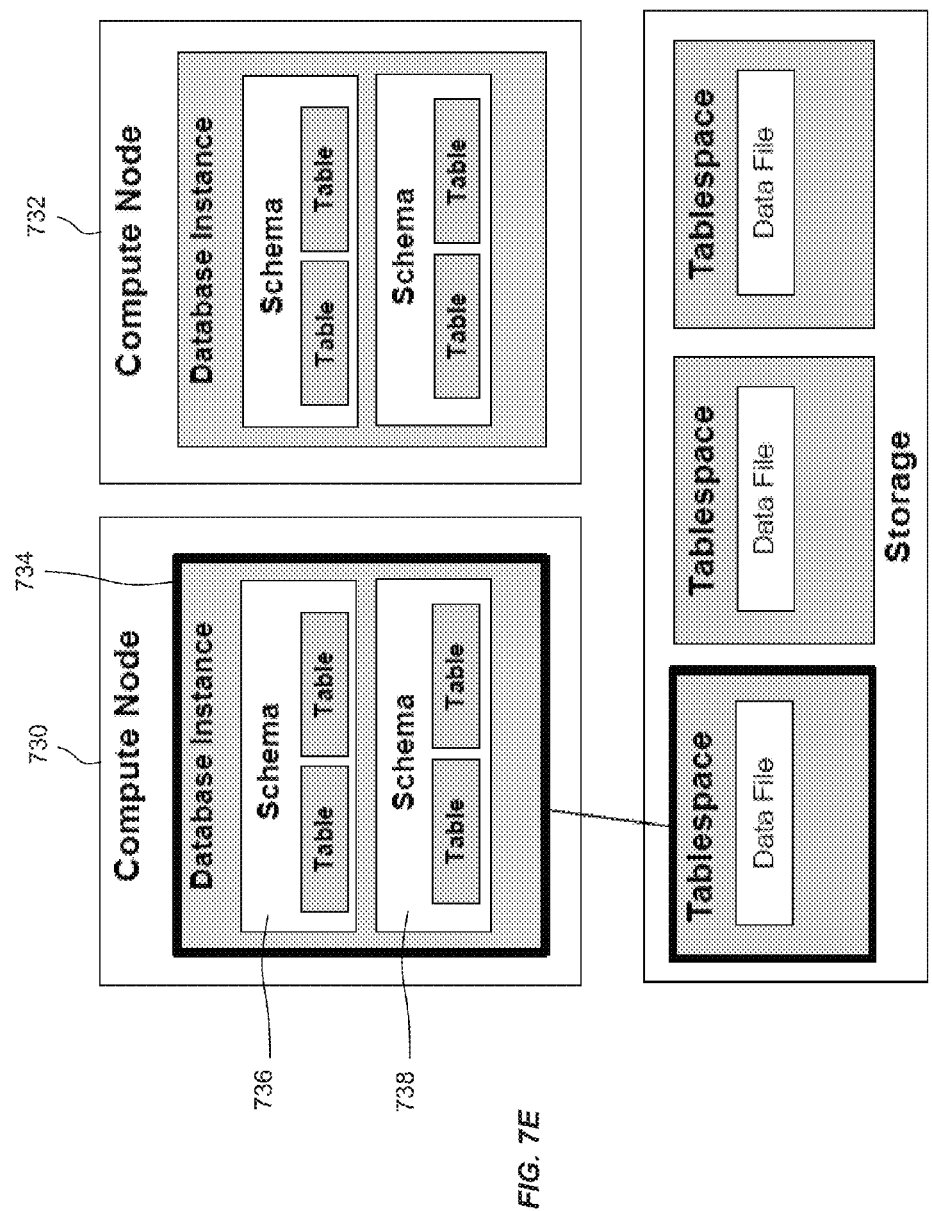
FIG. 7E depicts an example of database instances provisioned for a database service according to an embodiment of the present invention.

In certain embodiments, cloud infrastructure system 100 enables underlying hardware and service instances to be shared between customers or tenants. For example, the database service may be provisioned as shown in FIG. 7E in one embodiment. FIG. 7E depicts multiple Exadata compute nodes 730 and 732, each providing a database instance provisioned for the database service. For example, compute node 730 provides a database instance 734 for a database service. Each Exadata compute node may have multiple database instances.

In certain embodiments, each database instance can comprise multiple schemas and the schemas may be associated with different customers or tenants. For example, in FIG. 7E, database instance 734 provides two schemas 736 and 738, each with its own tables. Schema 736 may be associated with a first customer or tenant subscribing to a database service and schema 738 may be associated with a second customer or tenant subscribing to the database service. Each tenant gets a completely isolated schema. Each schema acts like a container that can manage database objects including tables, views, stored procedures, triggers, etc. for the associated tenant. Each schema may have one dedicated tablespace, with each tablespace having one data file.

In this manner, a single database instance can provide database services to multiple tenants. This not only enables sharing of underlying hardware resources but also enables sharing of service instance between tenants.

In certain embodiments, such a multi-tenancy system is facilitated by IDM 200, which beneficially enables multiple separate customers, each having their own separate identity domains, to use hardware and software that is shared in the cloud. Consequently, there is no need for each customer to have its own dedicated hardware or software resources, and in some cases resources that are not being used by some customers at a particular moment can be used by other customers, thereby preventing those resources from being wasted. For example, as depicted in FIG. 7E, a database instance can service multiple customers each with their respective identity domains. Although each such database service instance can be a separate abstraction or view of a single physical multi-tenant database system that is shared among the many separate identity domains, each such database service instance can have a separate and potentially different schema than each other database service instance has. Thus, the multi-tenant database system can store mappings between customer-specified database schemas and the identity domains to which those database schemas pertain. The multi-tenant database system can cause the database service instance for a particular identity domain to use the schema that is mapped to that particular identity domain.

The multi-tenancy can also be extended to other services such as the Java Service. For example, multiple customers can have a JAVA service instance placed within their respective identity domains. Each such identity domain can have a JAVA virtual machine, which can be viewed as being a virtual "slice" of hardware. In one embodiment, a job-monitoring service (e.g., Hudson) can be combined with a JAVA enterprise edition platform (e.g., Oracle WebLogic) in the cloud to enable each separate identity domain to have its own separate virtual "slice" of the JAVA enterprise edition platform. Such a job-monitoring service can, for example, monitor the execution of repeated jobs, such as building a software project or jobs run by an operating system's time-based job scheduler.

Such repeated jobs can include the continuous building and/or testing of software projects. Additionally or alternatively, such repeated jobs can include the monitoring of executions of operating system-run jobs that are executed on machines that are remote from the machine on which the job-monitoring service executes.

TAS Order Flow Control

According to some embodiments, TAS can implement a flow control (e.g., throttling, prioritizing) of customer orders. For example, TAS may use a TAS order flow control module 805 to accommodate scenarios wherein the available physical resources for hosted services in the cloud data center may not meet the incoming demand for service subscription orders.

Figure 8:
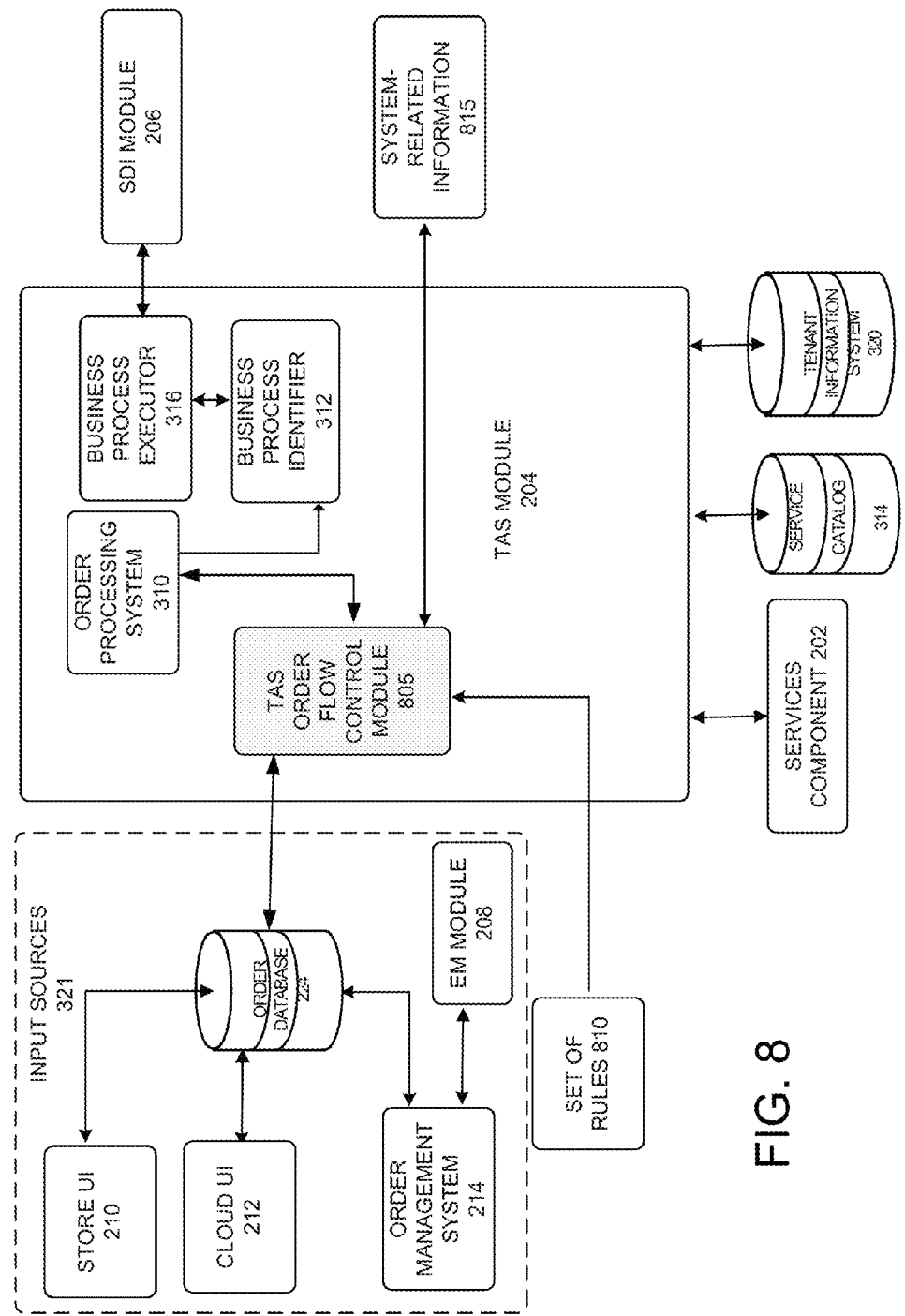
FIG. 8 depicts a simplified high level diagram of the components in the TAS module that may incorporate aTAS order flow control module, according to some embodiments.

FIG. 8 depicts a simplified high level diagram of the components in the TAS module 204 that may incorporate aTAS order flow control module 805, according to some embodiments. In one embodiment, the components depicted in FIG. 8 perform the processing described in steps 302-308 discussed in FIG. 3A. These components may be implemented in hardware, or software, or combinations thereof. The various components of the TAS module depicted in FIG. 8 are meant for illustrative purposes only and are not intended to limit the scope of embodiments of the present invention.

In one embodiment, TAS order flow control module 805 receives an order from a customer from one or more input sources 321. For example, order processing module 310 may directly receive an order via cloud UI 212 or store UI 210, in one embodiment. Alternatively, order processing module 310 may receive an order from order management module 214 or order database 224. TAS order flow control module 805 controls the TAS order flow before sending it to order processing module 310 for processing.

In one embodiment, TAS order flow control module 805 may control the TAS order flow based on set of rules 810 (e.g., flow control rules). In some instances the set of rules 810 can be preset by an administrator. Additionally, TAS order flow control module 805 may control the TAS order flow based on system-related information 815. In some instances, system-related information 815 can be received from EM module 208, SDI module 206, and/or TAS module 204.

In certain embodiments, TAS order flow control module 805 can receive system-related information 815 from EM module 208. For example, usage statistics for each of the provisioned services such as the amount of storage used, the amount data transferred, the number of users, and the amount of system up time and system down time can be received from EM module 208.

TAS order flow control module 805 can be a customizable model for handling of service capacity by throttling the provisioning of orders based on the system-related information 815. For example, SDI may have a finite set of resources and can receive more requests than SDI can satisfy. Therefore, in some instances, the orders can be throttled due to a lack of physical resources to satisfy the received orders.

In one example, system-related information 815 can include the different states of an order, which may be an initialized state, a provisioned state, an active state, an administration required state or an error state. In another example, system-related information 815 can include the amount of resources currently used for provisioning each service. In some instances, system-related information 815 can include information about the service level for a service in the subscription, services included in the subscription, time period of the subscription.

Additionally, the TAS order flow control module 805 can control the flow of orders based on set of rules 810. For example, the set of rules 810 can be based on, but not limited to, available capacity of each resource, set threshold limits for each resource, priority class of customer, and order placement in the queue for physical provisioning.

Furthermore, the throttling of orders by TAS can be completely transparent to customers. Additionally, in some instances, a customer may be informed of delays, rejections, estimated time of completion for their submitted orders, but the order may not be rejected at order placement time.

For instance, a customer may order a service using the Cloud UI. The cloud UI can send the order request to TAS for processing. When TAS picks up the order for processing, TAS module 204 can apply throttle mechanisms using the TAS order flow control module 805. As a result, the request order may go through the order flow control module 805 before being sent to SDI module 206 for provisioning.

For example, TAS can receive capacity information from the SDI module 206, EM module 208, and/or TAS module 204 via a system-related information 815 notification. In some instances, If SDI run out of capacity or surpass the set threshold capacity, then the TAS order control module 805 can step in to control the flow of orders (e.g., pause some orders). Furthermore, the orders can automatically be provisioned once the order flow control module is notified that capacity has been added. Additionally, the TAS order flow control module can estimate future resources that are needed based on orders which are in a pause state.

According to one embodiment, for every requested order received, TAS in real time can contact SDI to determine current capacity. For example, by checking the capacity before each order is processed, TAS can make sure that multiple orders are not processed when there is only one order left before the threshold limit is reached.

In some instances, based on the set of rules 810 sent to the TAS order flow control module 805, when the threshold limit has been reach, TAS can sent customer orders in a for a manual workflow approval, pause the order, or reject the order.

The manual workflow approval process can use a human administrator (e.g., operator personnel 220) to individually approve each requested order. If the requested order is approved in the manual workflow process, then the requested order can be sent back to the queue for processing with a different priority class. For example, the approved workflow orders from normal customers can be the highest priority after the orders from the preferred customers (e.g., gold customers). An approve order from the workflow can have a higher priority than a normal order because the order has been manually reviewed and approved. However, in some embodiments, a percentage of the resources are reserved for preferred customers, therefore even an approved order may not be processed until all the orders from the preferred customers are processed.

According to some embodiments, TAS can have functionality for flow control, which may include: auto-handling of over-capacity; preferred customer list; and order processing modes.

I. Auto-Handling of Over-Capacity

In order to accommodate over-capacity (e.g., where the demand for service subscriptions is greater than available supply of physical resources) the TAS flow control module 805 may implement certain controls.

Figure 9:
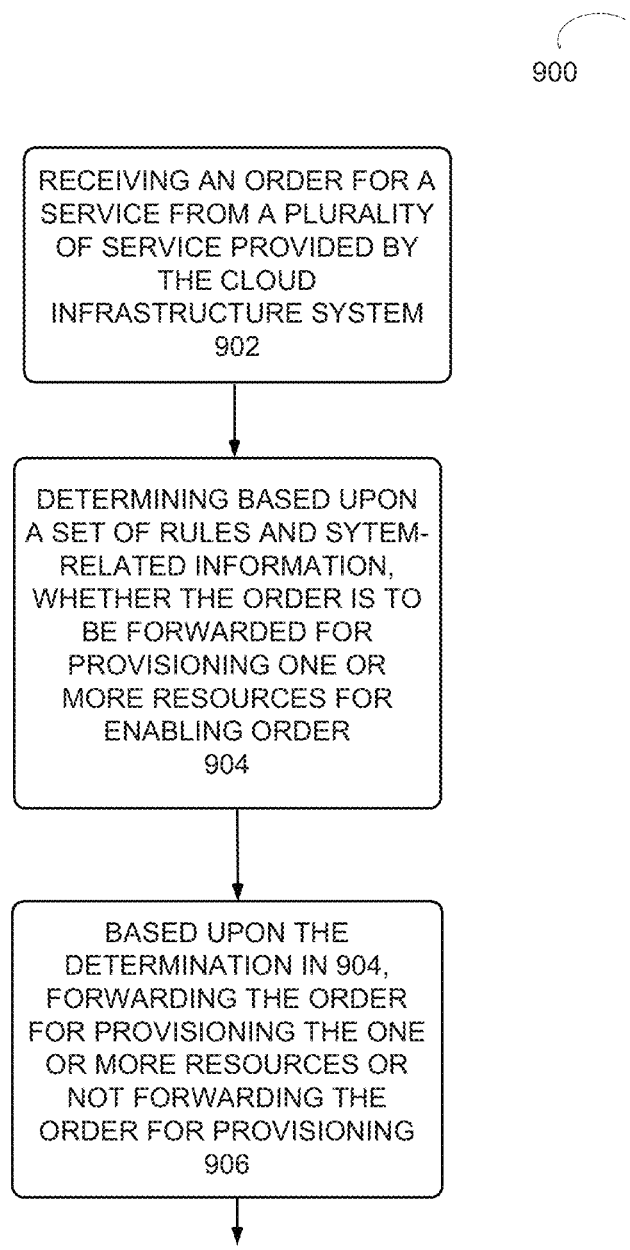
FIG. 9 depicts a simplified flowchart depicting processing that may be performed by the TAS flow control module 805 in the cloud infrastructure system, in accordance with an embodiment of the present invention.

FIG. 9 depicts a simplified flowchart depicting processing that may be performed by the TAS flow control module 805 in the cloud infrastructure system, in accordance with an embodiment of the present invention. The processing 900 depicted in FIG. 9 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 9 is not intended to be limiting.

At 902, TAS flow control module 805 can receiving an order for a service from a plurality of service provided by the cloud infrastructure system. For example, TAS flow control module 805 can receive a customer order from the store UI 210, cloud UI 212, order management system 214, or order database 214, as previously described in FIG. 8. In one example, after receiving an order, TAS flow control module 805 can send a status request of available resources for the provisioning of the service associated with a customer order. The status request can allow TAS flow control module 805 to system-related information 815 for the provisioning of the service associated with a customer order. For example, system-related information 815 can include an unavailability of resources, a threshold limit met, or a percentage of resources used.

According to one embodiment, the status request (e.g., SDI provisioning call) may return a percentage of resources used. In this instance, the TAS flow control module can set a threshold limit and adjust the order flow accordingly once the threshold has been met. TAS can receive a matrix of available resources and threshold limits for each service.

At 904, TAS flow control module 805 can determine based upon a set of rules and system-related information, whether the order is to be forwarded to order processing system 310 for provisioning one or more resources for enabling the order.

At 906, based upon the determining at 904, TAS flow control module 805 can forward the order for provisioning the one or more resources or not forwarding the order for provisioning. At 906, the TAS flow control module 805 can throttle the provisioning of the service associated with the customer order based on set of rules 810. In some instances the flow control rules can be based on priority, time, or order processing mode.

Figure 10:
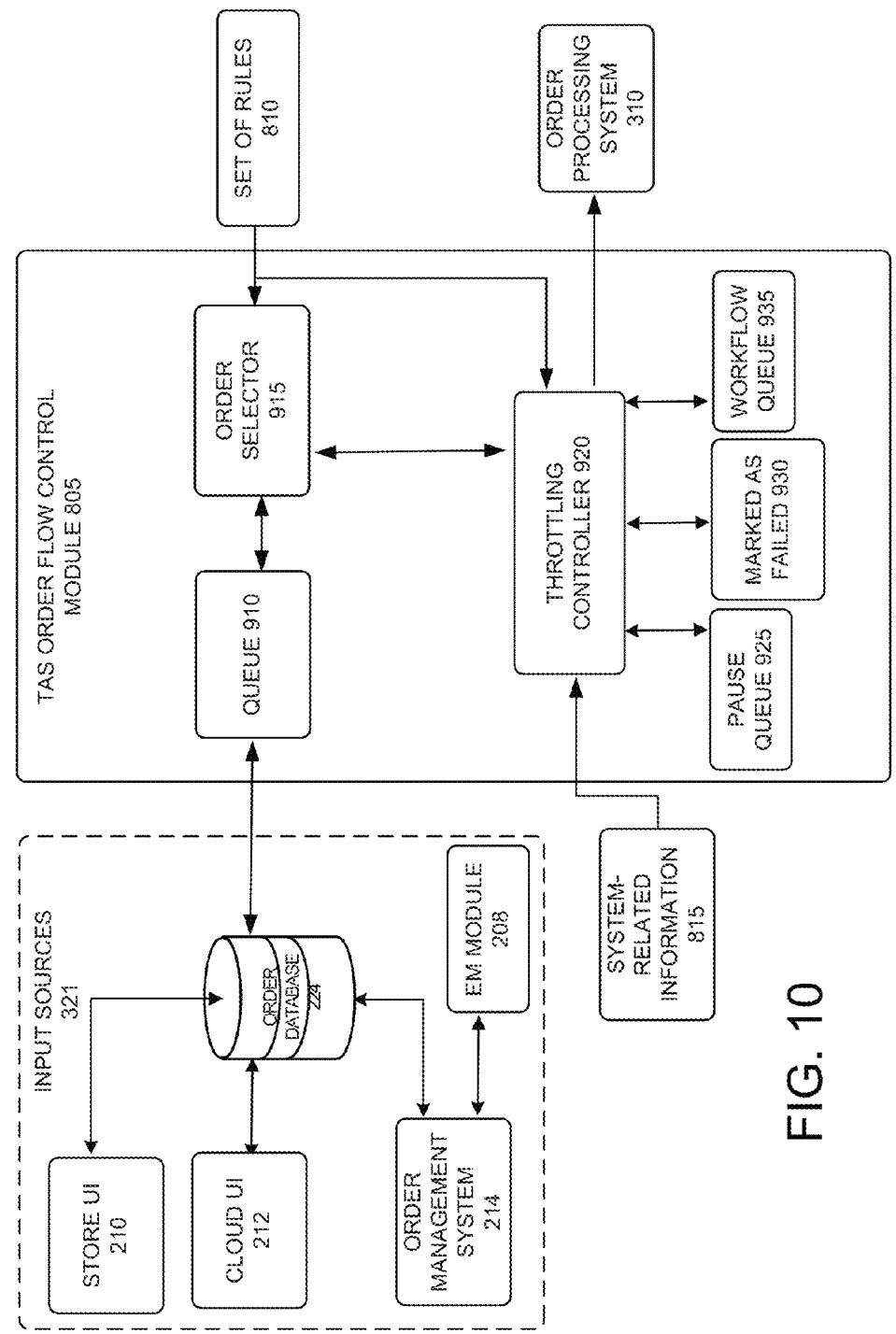
FIG. 10 depicts a simplified high level diagram of the components in TAS order flow control module, according to some embodiments.

FIG. 10 depicts a simplified high level diagram of the components in TAS order flow control module 805, according to some embodiments. In one embodiment, the components depicted in FIG. 10 perform the processing described in steps 902-906 discussed in FIG. 9. These components may be implemented in hardware, or software, or combinations thereof. The various components of TAS order flow control module 805 depicted in FIG. 10 are meant for illustrative purposes only and are not intended to limit the scope of embodiments of the present invention.

According to some embodiments, a customer order from order database 224 can be sent to the queue 910 in the TAS order flow control module 805. From queue 910, an order selector 915 can prioritize the orders based on set of rules 810. Then, order selector 915 can sent the prioritized orders to a throttling controller 920. Throttling controller 920 can determine whether to send the order to: a pause queue 925; a marked as failed queue 930; a workflow queue 935; or order processing system 310 based on system-related information 815 and set of rules 810.

For example, when the SDI provisioning call returns an unavailable resource notification (e.g., RESOURCE_UNAVAILABLE error) for a given service, the TAS flow control module 805 can throttle the provisioning of the service. Throttling can include, but is not limited to: sending the order to pause queue 925; marking the order as failed and resubmit by sending the order to marked as failed queue 930; sending the order to workflow queue 935; sending the order for processing by sending the order to order processing system 310; or sending an email notification to an administrator.

In the pause queue 925, throttling controller 920 can pause any subsequent orders for the service that is over-capacity and resume processing of the orders only when the available capacity is increased. This can be done so as to not burden administrators to manually resume all orders failed due to unavailable capacity once capacity becomes available. Thus, TAS flow control module 805 may pause subsequent orders based on the over-capacity.

When an order is paused, throttling controller 920 can send a notice to the customer informing the customer that the order is paused and will be processed soon. In some instances, the order flow control module can send periodic notification with status updates for the order.

In the marked as failed queue 930, throttling controller 920 can mark the failed order (e.g., mark as resubmit-upon-available-capacity) and resubmit the order to the queue 910 with the same request-id to SDI once capacity becomes available. According to another embodiment, throttling controller 920 may not resubmit the order. This action may be taken for all in-flight orders that run into the unavailable resource notification (e.g., RESOURCE_UNAVAILABLE error).

In the workflow queue 935, throttling controller 920 can send the order to a workflow. The workflow can be a manual (e.g., human-based) approving process. The workflow can be used to filter out the orders that are less likely to be used. For example, a customer may place an order without the intentions of using the service. In the workflow, an administrator can manually approve each order that comes into the workflow. For example, an administrator (e.g., project managers) can go to conferences and meet potential customers and collect information about the potential customer. Additionally, all orders from certain countries may have to go through the workflow for approval. Once the requested order has been approved by the workflow, the order can be processed or the order can be sent back to the queue with a higher priority level. Sometimes the approved workflow order can be sent back to the order flow control module because an approved workflow order may still have a lower priority than a gold customer order.

According to another embodiment, throttling controller 920 can send the order to order processing system 310 for provisioning the requested service. FIG. 3B describes the process for provisioning the requested service once the order is received by order processing system 310.

According to another embodiment, the TAS flow control module 805 can send an email notification to an administrator to indicate that SDI returned an unavailable resource notification (e.g., a RESOURCE_UNAVAILABLE exception), so that the administrator can procure more hardware. According to another embodiment, SDI can send a notification directly to the administrator; therefore TAS may skip this step.

Furthermore, as TAS keeps track of any over-capacity status on a per-service basis (e.g., when SDI sends a RESOURCE_UNAVAILABLE exception), TAS may maintain this status separately for the common pool and for the preferred customer reserved pool. This may allow us to throttle regular order requests independently of preferred customer order requests.

Figure 11:
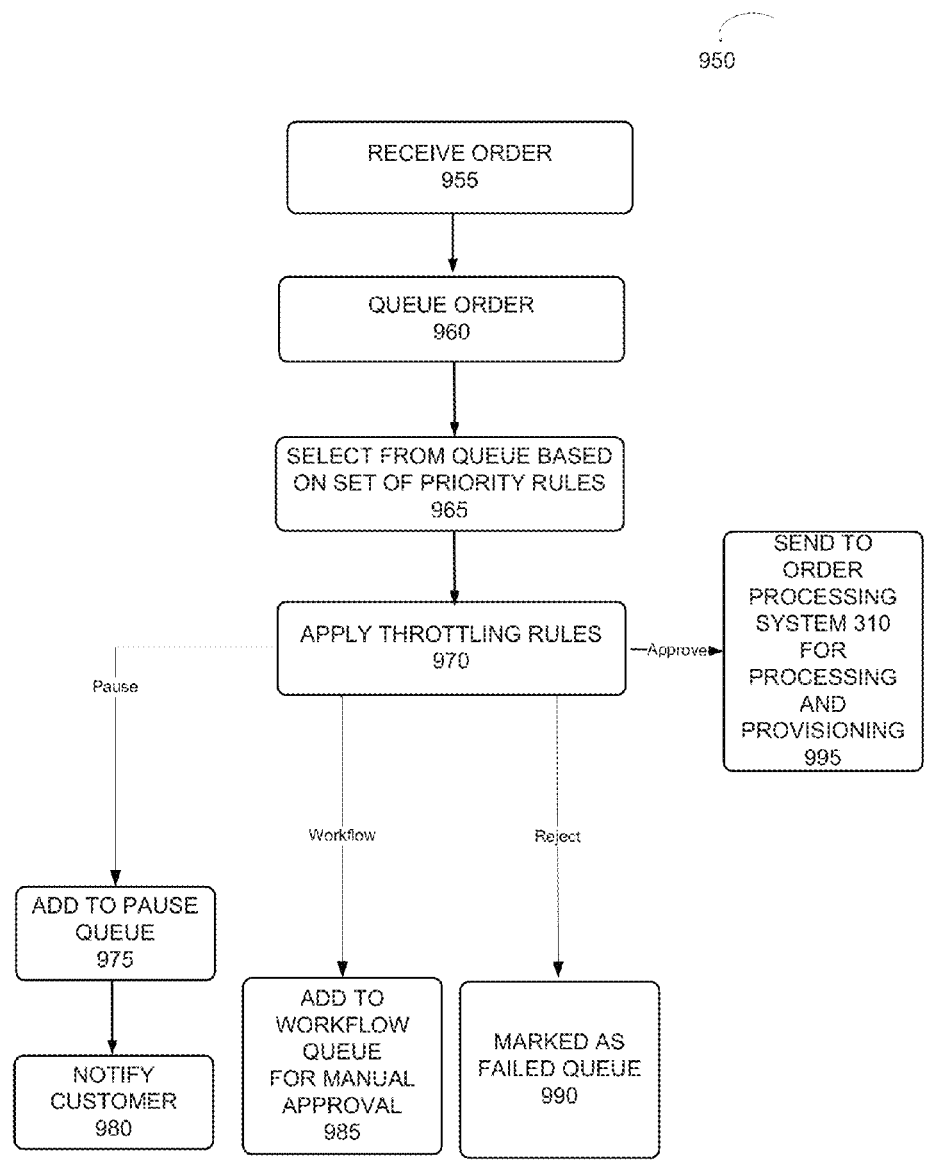
FIG. 11 depicts a simplified flowchart depicting processing that may be performed by the TAS flow control module 805 in the cloud infrastructure system, in accordance with another embodiment of the present invention.

FIG. 11 depicts a simplified flowchart depicting processing that may be performed by TAS flow control module 805 in the cloud infrastructure system, in accordance with another embodiment of the present invention. The processing 950 depicted in FIG. 11 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 11 is not intended to be limiting.

At 955, TAS flow control module 805 can receive an order from input sources 321. At 960, TAS flow control module 805 can queue order into queue 910. At 965, TAS flow control module 805 can select from queue 910 based on set of priority rules (e.g., set of rules 810). At 970, TAS flow control module 805 can apply throttling rules based on set of throttling rules (e.g., set of rules 810) and system related information 815.

As previously described in FIG. 10, at 970, throttling controller 920 can send the order to: a pause queue 925; a marked as failed queue 930; a workflow queue 935; or order processing system 310 based on system-related information 815 and set of rules 810.

At 975, TAS flow control module 805 can pause the order and at 980 TAS flow control module 805 can notify the customer that the order is paused. Alternatively, at 985, TAS flow control module 805 can add the order to workflow queue for manual approval. Alternatively, at 990, TAS flow control module 805 can reject the order and send the order to the mark as failed queue. Alternatively, at 995, TAS flow control module 805 can approve the order and sent the order to order processing system 310 for processing and provisioning.

A. TAS Determining Increased Capacity

In some instances, The TAS order flow control module can poll SDI module 206 or EM module 208 for an updated status request of the available resources for provisioning of the service associated with the customer order. The request information can be return as system-related information 815.

For example, once TAS gets an unavailable resource notification (e.g., RESOURCE_UNAVAILABLE error) from SDI or EM for a given service, TAS may resume processing orders for that service only after capacity is increased for that service.

According to some embodiments, TAS may determine when the capacity has been increased by: periodically calling SDI or EM to check available capacity; or the Ops team notifying TAS that the capacity has increased. For example, for each service that encountered the unavailable resource notification, a TAS background job may periodically call SDI to check available capacity. Additionally, in some instances, the Ops team may be provided a command line utility (e.g., tasctl command) to signal to TAS that capacity for a service has been increased.

B. Notification to the Customer

In some instances, TAS order flow control module 805 can notify the customer who requested the specific order with the status of the provisioning of the service.

TAS may investigate a mechanism wherein it notifies the customer of any delays in the provisioning (e.g., due to unavailable capacity, due to other reasons). For example, TAS can send the customer an initial notification that the order was received. Subsequently, a background job can wake up periodically and send other notifications (e.g., "Please wait, the order is processing"). The timing of notification can be configurable (e.g., once every two days).

II. Prioritizing Customers and Threshold Mechanism

TAS order flow control module 805 can prioritize customers using order selector 915 based on set of rules. Additionally, TAS order flow control module 805 can use throttling controller 920 when implementing the throttling of customer orders based on set of rules 810 and system-related information 815.

According to some embodiments, order selector 915 may have the ability to fast track orders for preferred customers (e.g., gold customers). Order selector 915 prioritize customers by using an invitation code mechanism. Customers can get invitation codes using mechanism that can be independent of the TAS overflow control module.

In some instances, invitations can have the following attributes: priority, custom trial period. Examples of priority can include: LOW, NORMAL, or HIGH. For example, gold customers can get HIGH priority invitation codes. Customers that have consistent large paid orders (e.g., over $100,000) can be gold customers.

Additionally, a customized trial period for prioritized customers can override the default trial period for a service. For example, gold customers may be given longer trial periods. Moreover, orders can be prioritized based on the status of a customer (e.g., a potential paying customer).

According to some embodiments, mechanisms can be implemented that once a threshold capacity has been passed; the remaining order can only be used for high priority customers (e.g., gold customers). For example, the maximum capacity can be 100 orders, and if current capacity is below a set threshold (e.g., current capacity is below 50 orders), then orders are taken on a first come first serve basis. However, when the current capacity is above the set threshold (e.g., current capacity is over 50 orders), and then the remaining orders are saved for provisioning orders from preferred customers. The priority of customers and threshold can be set by an administrator.

In some instances, throttling controller 920 can control the flow of orders being provisioned. For example, once the threshold limits are set, (i.e. a threshold of 60 percent of the service capacity) then the remaining orders can go through the overflow control module. For example, the sixty-first order that's being processed by TAS will not go into the regular flow. The sixty-first order goes through the overflow control module, because the threshold limit has been reached. The overflow control module can then determine if the order should be processed based on set criteria (e.g., prioritized customer list) discussed herein.

Order processing may interpret the invitation code based on: an order of priority; service instances reserved for preferred customers; and a custom trial period.

For example, orders may be processed in order of priority (i.e. orders with HIGH priority may be processed ahead of orders with LOW or NORMAL priority). Additionally, orders with the same priority may be processed in the time order in which they are submitted. The order flow control module can sort based on priority and timing of requested order.

Moreover, TAS may pass the priority to SDI in order to allow SDI to allocate service instances from pools reserved for preferred customers in case of HIGH priority orders.

Furthermore, TAS may create the service subscription using the custom trial period, if specified as part of the invitation code. In some instances, the TAS trial management code may not change to honor the subscription period for each individual subscription.

Additionally, TAS can reject order from specific customers. For example, malicious denial of service can be one example of a rejected order. In some instances, orders can be rejected based on the geographically location of the order or a blacklist. In other instances, orders can be rejected based other requirements (e.g., order is from a competitor).

For example, once TAS order flow control module 805 receives a customer order, TAS order flow control module 805 determines the type of service requested. Then, TAS order flow control module 805 can contact the system provisioning for the service and request a resource capacity status. Based on the resource capacity status and predefined set of rules (e.g., priority list), TAS order flow control module 805 can make a determination.

According to some embodiments, the processing of a requested order can be based on timing (e.g., received timestamp associated with the customer order). For example, in addition to the other rules, the work flow control module can process orders on a first-come first-served basis for each order category.

III. Order Selector

In addition to managing the flow of orders when demand is greater than available capacity, order selector 915 can provide the ability to control which customer orders enter the order queue in the first place (e.g., based on the potential of the customer).

This functionality may be supported based on the order processing mode. The order processing mode can be set as a system-wide default and can be optionally overridden on a per-service basis. The order processing mode can include: open plus optional invitation; manual approval; invitation only; or invitation plus manual approval.

In the open plus optional invitation mode, (e.g., OPEN_PLUS_OPTIONAL_INVITATION), all orders may be accepted. Customers can optionally enter an invitation code. Orders may get processed on a first-come, first-served basis unless the order has an invitation code, which may give their orders priority.

In the manual approval only mode (e.g., MANUAL_APPROVAL_ONLY), all orders may go through a human approval before being processed.

In the invitation only mode (e.g., INVITATION_ONLY), only orders with invitation codes may be accepted. Additionally, orders may be processed in order of invitation code priority.

In the invitation plus manual approval mode, (e.g., INVITATION_PLUS_MANUAL_APPROVAL), orders with invitation codes may be processed first in order of invitation code priority. Orders without an invitation code may go through a human approval.

TAS order control module 805 may support a notion of invitation codes to control which customers can request trial service subscriptions. TAS order control module 805 may support different methods of generating invitation codes.

For example, customers may be allowed to request invitations to participate in trial offerings for the service. TAS may provide an API to request invitations. Invitation requests may go through a human workflow and may have to be approved by the Ops team and/or administrators. Once approved, TAS may send a notification to the customer inviting them to participate along with their custom invitation code. The customer can then use that invitation code to place trial orders. In processing the order, TAS may validate that the invitation code matches the requestor's email address.

Alternatively, the Ops team and/or administrators can also generate invitations for selected customers using a TAS API/User Interface/Command-line interface. TAS may send a notification to the customer inviting them to participate along with their custom invitation code. The customer can then use that invitation code to place trial orders. In processing the order, TAS may validate that the invitation code matches the requestor's email address.

Regardless of the order processing mode used for a service, it can be possible for the demand to exceed available capacity. Therefore, TAS can enforce the auto-handling of over-capacity independent of the support for the order processing mode. For instance, if there are only 100 preferred customer reserved anonymous Java service instances in the pool and there are 200 preferred customer orders coming in, the TAS module may automatically enforce the over-capacity logic.

Additionally, TAS may provide command-line tools or user interface to allow Ops developer and administrators to: list all orders pending approval (e.g., by leveraging the BPEL Human Workflow); change priority of a specific order (e.g., to mark some customer as a preferred customer); and pre-emptively terminate a subscription by changing the subscription dates.

IV. HTTP Routing Layer

According to some embodiments, the cloud system can rely on the routing of HTTP traffic from published endpoints (e.g., URL) to individual service instances that are actually serving content for the various customer-facing services. This routing layer can be based on a common, shared set of HTTP server (e.g., Oracle's OHS) instances that are configured as reverse proxies to route traffic from the client to the appropriate service instance.

The HTTP routing layer can consist of multiple pools of HTTP servers with one pool per service type. This can provide isolation at the service layer from outages as well as configuration isolation on a service-by-service basis.

Furthermore, TAS order control module 805 can use the routing scheme to map services to instances can vary depending on service type, but each routing scheme determines the tenant and service instance to which a request is intended and then routes the traffic to the appropriate service instance. This mapping is based on information that is provided to the routing layer from SDI. For certain services, the routing scheme can be configured using the HTTP server. For others, an HTTP server module performs the tenant to service instance mapping.

Additionally, the HTTP routing layer can provide a simple throttling mechanism to ensure that users are not trying to circumvent their user limits by making large number of service calls to do something like provide an alternate user interface to their Fusion Applications instance. The throttling algorithm limits the number of concurrent user requests that a given tenant can have. An HTTP server module (e.g., similar to mod_qos1) can do the throttling. Mod_qos1 is a loadable webserver module that limits concurrent connections to the webserver.

Figure 12:
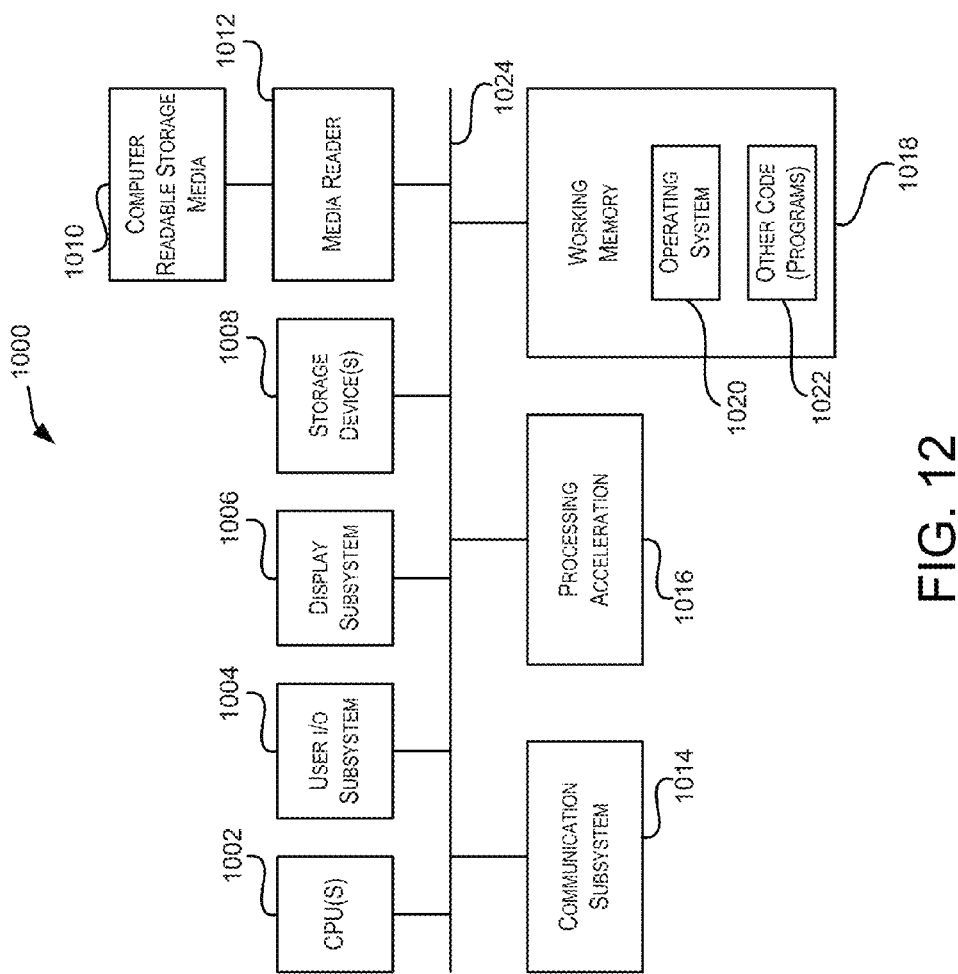
FIG. 12 is a simplified block diagram of a computing system that may be used in accordance with embodiments of the present invention.

FIG. 12 is a simplified block diagram of a computing system 1000 that may be used in accordance with embodiments of the present invention. For example, cloud infrastructure system 100 may comprise one or more computing devices. System 1000 depicted in FIG. 12 may be an example of one such computing device. Computer system 1000 is shown comprising hardware elements that may be electrically coupled via a bus 1024. The components may include one or more processing units 1002, an input subsystem 1004, an output subsystem 1006, storage devices 1008, a computer-readable storage media reader 1012 connected to a computer-readable storage medium 1010, a communication subsystem 1014, a processing acceleration subsystem 1016, and working memory 1018.

Bus subsystem 1024 provides a mechanism for letting the various components and subsystems of computer system 1000 communicate with each other as intended. Although bus subsystem 1024 is shown schematically as a single bus, alternative embodiments of the bus subsystem may utilize multiple busses.

Input subsystem 1004 may include one or more input devices such as a mouse, a keyboard, a pointing device, a touchpad, etc. In general, input subsystem 1004 may include any device or mechanism for inputting information to computer system 1000.

Output subsystem 1006 may include one or more output devices for outputting information from computer system 1000. Examples of output devices include without limitation a display device, a printer, a projection device, etc. In general, output subsystem 1006 may include any device or mechanism for outputting information from computer system 1000.

Processing unit(s) 1002 can include one or more processors, one or more cores of processors, combinations thereof, and the like. In some embodiments, processing unit(s) 1002 can include a general purpose primary processor as well as one or more special purpose co-processors such as graphics processors, digital signal processors, or the like. In some embodiments, some or all processing units 1002 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1002 can execute instructions stored in working memory 1018 or on storage devices 1008. In various embodiments, processing units 1002 can execute a variety of programs or code instructions and can maintain multiple concurrently executing programs or processes. At any given time, some or all of the program code to be executed can be resident in system working memory 1018, storage devices 1008, and/or on computer-readable storage media 1010. Through suitable programming, processing units 1002 can provide various functionalities described above for performing event stream-related processing. In some embodiments, computer system 1000 may also include a processing acceleration unit 1016, which can include a digital signal processor (DSP), a special-purpose processor, and/or the like.

Storage device(s) 1008 may include memory devices such as disk drives, optical storage devices, and solid-state storage devices such as a random access memory (RAM) and/or a read-only memory (ROM), which can be programmable, flash-updateable and/or the like. Software (programs, code modules, instructions), which when executed by processing unit(s) 1002 to provide the functionality described above, may be stored on storage devices 1008. Storage devices 1008 may also provide a repository for storing data used in accordance with embodiments of the present invention.

Computer-readable storage media reader 1012 can further be connected to a computer-readable storage medium 1010, together (and, optionally, in combination with storage device(s) 1008) comprehensively representing remote, local, fixed, and/or removable memory storage devices plus storage media for temporarily and/or more permanently containing computer-readable information.

Communications subsystem 1014 may permit data to be exchanged with network and/or any other computers. Communication subsystem 1014 serves as an interface for receiving data from and transmitting data to other systems from computer system 1000. The communication may be provided using wired or wireless protocols. For example, communication subsystem 1014 may enable computer 1000 to connect to a client device via the Internet. Communication subsystem 1014 may comprise a modem, a network card (wireless or wired), an infra-red communication device, a GPS receiver, etc.

Working memory subsystem 1018 may include a number of memories including a main random access memory (RAM) for storage of instructions and data during program execution and a read only memory (ROM) in which fixed instructions are stored. Software elements such as an operating system 1020 and/or other code 1022, such as an application program (which may be a client application, Web browser, mid-tier application, RDBMS, etc.), may be stored in working memory 1018. In an exemplary embodiment, working memory 1018 may include executable code and associated data structures (such as caches) used for processing events and enabling variable duration windows processing as described above.

It should be appreciated that alternative embodiments of computer system 1000 may have more or less components with numerous variations from that described above. For example, customized hardware might also be used and/or particular elements might be implemented in hardware, software (including portable software, such as applets), or both. Further, connection to other computing devices such as network input/output devices may be employed.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
    storing, by a computer resource infrastructure system, order information about an order for a service from a plurality of services provided by the computer resource infrastructure system, the computer resource infrastructure system comprising one or more computing devices;
    determining, by a computing device from the one or more computing devices, based upon an order processing rule and system-related information, whether a resource capacity of the computer infrastructure system meets a threshold resource capacity, wherein the order processing rule includes the threshold resource capacity, and wherein the system-related information indicates the resource capacity;

upon determining that the resource capacity does not meet the threshold resource capacity, sending a request to provision one or more resources to enable the service for the order;

upon determining that the resource capacity meets the threshold resource capacity:
  delaying the request from being sent, wherein delaying the request includes storing the order information within a queue for future order processing, and wherein the queue stores order information about one or more orders that are delayed;
  detecting an updated resource capacity of the computer resource infrastructure system after delaying the request, wherein the updated resource capacity corresponds to a change in the resource capacity;
  removing the order information from the queue based on determining that the updated resource capacity does not meet the threshold resource capacity; and
  upon removing the order information form the queue, sending the request to provision the one or more resources to enable the service for the order.

2. The method of claim 1, wherein the order processing rule includes a service-specific threshold limit for available resources specific to a type of service and wherein determining whether the resource capacity meets the threshold resource capacity includes determining whether the resource capacity meets the service-specific threshold limit.

3. The method of claim 2, further comprising:
  determining that the order is for a preferred customer according to a customer priority list; and
  upon determining that the resource capacity meets the threshold resource capacity, determining whether to delay the request based on the customer priority list.

4. The method of claim 1, wherein the determining comprises:
  determining that the order should be marked as failed and resubmitted; and
  preventing the request from being sent to provision the one or more resources to enable the service for the order.

5. The method of claim 1, wherein the determining comprises:
  determining that the order should be sent to workflow for a manual approval by the administrator; and
  delaying the request from being sent to provision the one or more resources to enable the service for the order until the order is manually approved by an administrator.

6. The method of claim 1, further comprising:
  sending a notification to increase available resources in the computer resource infrastructure system based on determining that the resource capacity meets the threshold resource capacity.

7. The method of claim 1, wherein the order processing rule is based on a timestamp associated with the order.

8. The method of claim 1, wherein the set of rules further include rules based on an order processing mode, and wherein the order processing mode includes: open plus optional invitation; manual approval; invitation only; or invitation plus manual approval.

9. The method of claim 1, wherein the system-related information includes: usage statistics for each service of the plurality of services, an amount of storage used for each service, an amount of data transferred for each service, a number of users, an amount of system up time, or an amount of system down time.

10. A system comprising:
  one or more computing devices configurable to offer a set of services;
  memory configurable to store an order for a service from the set of services provided by the computer resource infrastructure system; and
  wherein a computing device from the one or more computing devices is configured to:
    determine based upon an order processing rule and system-related information, whether a resource capacity of the computer resource infrastructure system meets a threshold resource capacity, wherein the order processing rule includes the threshold resource capacity, and wherein the system-related information indicates the resource capacity;
  upon determining that the resource capacity does not meet the threshold resource capacity, send a request to provision one or more resources to enable the service for the order;
  upon determining that the resource capacity meets the threshold resource capacity:
    delay the request from being sent, wherein delaying the request includes storing the order information within a queue for future order processing, and wherein the queue stores order information about one or more orders that are delayed;
    detect an updated resource capacity of the computer resource infrastructure system after delaying the request, wherein the updated resource capacity corresponds to a change in the resource capacity;
    remove the order information from the queue based on determining that the updated resource capacity does not meet the threshold resource capacity; and
    upon removing the order information form the queue, send the request to provision the one or more resources to enable the service for the order.

11. The system of claim 10, wherein the order processing rule includes a service-specific threshold limit for available resources specific to a type of service and wherein determining whether the resource capacity meets the threshold resource capacity includes determining whether the resource capacity meets the service-specific threshold limit.

12. The system of claim 11, wherein the computing device is further configured to:
  determine that the order is for a preferred customer according to a customer priority list; and
  upon determining that the resource capacity meets the threshold resource capacity, determine whether to delay the request based on the customer priority list.

13. The system of claim 10, wherein the computing device is further configured to:
  determine that the order should be marked as failed and resubmitted; and
  prevent the request from being sent to provision the one or more resources to enable the service for the order.

14. The system of claim 10, wherein the computing device is further configured to:
  determine that the order should be sent to workflow for a manual approval by the administrator; and
  delay the request from being sent to provision the one or more resources to enable the service for the order until the order is manually approved by an administrator.

15. The system of claim 10, wherein the computing device is further configured to:
  send a notification to increase available resources based on determining that the resource capacity meets the threshold resource capacity.

16. The system of claim 10, wherein the order processing rule is based on a timestamp associated with the order.

17. The system of claim 10, wherein the set of rules further include rules based on an order processing mode, and wherein the order processing mode includes: open plus optional invitation; manual approval; invitation only; or invitation plus manual approval.

18. The system of claim 10, wherein the system-related information includes: usage statistics for each service of the set of services, an amount of storage used for each service, an amount of data transferred for each service, a number of users, an amount of system up time, or an amount of system down time.

19. One or more non-transitory computer-readable media storing computer executable instructions for a computer resource infrastructure system configured to offer a set of services that, when executed, cause one or more computing devices in the computer resource infrastructure system to:
store an order for a service from the set of services provided by the computer resource infrastructure system;
determine based upon an order processing rule and system-related information, whether a resource capacity of the computer resource infrastructure system meets a threshold resource capacity, wherein the order processing rule includes the threshold resource capacity, and wherein the system-related information indicates the resource capacity;
upon determining that the resource capacity does not meet the threshold resource capacity, sending a request to provision one or more resources to enable the service for the order;
upon determining that the resource capacity meets the threshold resource capacity:
delay the request from being sent, wherein delaying the request includes storing the order information within a queue for future order processing, and wherein the queue stores order information about one or more orders that are delayed;
detect an updated resource capacity of the computer resource infrastructure system after delaying the request, wherein the updated resource capacity corresponds to a change in the resource capacity;
remove the order information from the queue based on determining that the updated resource capacity does not meet the threshold resource capacity; and
upon removing the order information form the queue, send the request to provision the one or more resources to enable the service for the order.

20. The one or more non-transitory computer-readable media of claim 19, wherein the order processing rule includes a service-specific threshold limit for available resources specific to a type of service and wherein determining whether the resource capacity meets the threshold resource capacity includes determining whether the resource capacity meets the service-specific threshold limit.

21. The one or more non-transitory computer-readable media of claim 20, wherein the instructions, when executed, further cause the one or more computing devices to:
determine that the order is for a preferred customer according to a customer priority list; and
upon determining that the resource capacity meets the threshold resource capacity, determine whether to delay the request based on the customer priority list.

22. The one or more non-transitory computer-readable media of claim 19, wherein the instructions, when executed, further cause the one or more computing devices to:
determine that the order should be marked as failed and resubmitted; and
prevent the request from being sent to provision the one or more resources to enable the service for the order.

23. The one or more non-transitory computer-readable media of claim 19, wherein the instructions, when executed, further cause the one or more computing devices to:
determine that the order should be sent to workflow for a manual approval by the administrator; and
delay the request from being sent to provision the one or more resources to enable the service for the order until the order is manually approved by an administrator.

24. The one or more non-transitory computer-readable media of claim 19, wherein the instructions, when executed, further cause the one or more computing devices to:
send a notification to increase available resources based on determining that the resource capacity meets the threshold resource capacity.

25. The one or more non-transitory computer-readable media of claim 19, wherein the order processing rule is based on a timestamp associated with the customer order.

26. The one or more non-transitory computer-readable media of claim 19, wherein the set of rules further include rules based on an order processing mode, and wherein the order processing mode includes: open plus optional invitation; manual approval; invitation only; or invitation plus manual approval.

27. The one or more non-transitory computer-readable media of claim 19, wherein the system-related information includes: usage statistics for each service of the plurality of services, an amount of storage used for each service, an amount of data transferred for each service, a number of users, an amount of system up time, or an amount of system down time.

28. The method of claim 1, further comprising:
determining whether the updated resource capacity meets the threshold resource capacity; and
upon determining that the updated resource capacity meets the threshold resource capacity, further delaying the request from being sent by preventing the order information from being removed from the queue.

29. The method of claim 1, wherein the order information is stored and removed from the queue based on a priority of each of the one or more orders that are delayed.

30. The method of claim 29, wherein the order information is removed from the queue based on a priority class of a customer associated with the order information.

31. The system of claim 10, wherein the computing device is further configured to:
determine whether the updated resource capacity meets the threshold resource capacity; and
upon determining that the updated resource capacity meets the threshold resource capacity, further delaying the request from being sent by preventing the order information from being removed from the queue.

32. The system of claim 10, wherein the order information is stored and removed from the queue based on a priority of each of the one or more orders that are delayed.

33. The system of claim 32, wherein the order information is removed from the queue based on a priority class of a customer associated with the order information stored within the queue.

34. The one or more non-transitory computer-readable media of claim 19, wherein the instructions, when executed, further cause the one or more computing devices to:
determine whether the updated resource capacity meets the threshold resource capacity; and upon determining that the updated resource capacity meets the threshold resource capacity, further delaying the request from being sent by preventing the order information from being removed from the queue.

35. The one or more non-transitory computer-readable media of claim 19, wherein the instructions further cause the order information to be stored and removed from the queue based on a priority of each of the one or more orders that are delayed.

* * * * *